(12) United States Patent
Jang et al.

(10) Patent No.: US 11,694,083 B2
(45) Date of Patent: Jul. 4, 2023

(54) SIGNAL TRANSLATION SYSTEM AND SIGNAL TRANSLATION METHOD

(71) Applicant: ALETHIO CO., Daejeon (KR)

(72) Inventors: Ho Yong Jang, Suwon-si (KR); Kwang Min Choi, Seoul (KR); Se Kyung Kim, Seoul (KR); Da Woon Kim, Seoul (KR)

(73) Assignee: ALETHIO CO., Daejeon (KR)

( * ) Notice: Subject to any disclaimer, the term of this patent is extended or adjusted under 35 U.S.C. 154(b) by 932 days.

(21) Appl. No.: 16/160,859

(22) Filed: Oct. 15, 2018

(65) Prior Publication Data

US 2019/0114462 A1 Apr. 18, 2019

Related U.S. Application Data

(60) Provisional application No. 62/572,507, filed on Oct. 15, 2017.

(30) Foreign Application Priority Data

May 2, 2018 (KR) .................. 10-2018-0050390
Oct. 10, 2018 (KR) .................. 10-2018-0120762

(51) Int. Cl.
*G06N 3/084* (2023.01)
*G06F 40/40* (2020.01)
(Continued)

(52) U.S. Cl.
CPC ........... *G06N 3/084* (2013.01); *G06F 18/211* (2023.01); *G06F 18/21355* (2023.01);
(Continued)

(58) Field of Classification Search
CPC ............. G06K 9/3233; G06K 9/0053; G06K 9/00543; G06K 9/6269; G06K 9/6228;
(Continued)

(56) References Cited

U.S. PATENT DOCUMENTS 9,858,663 B2 *  1/2018  Penney ................. G06T 11/003
11,250,546 B2 *  2/2022  Pu ......................... G06T 7/0002
(Continued)

FOREIGN PATENT DOCUMENTS

JP         2001326806 A  * 11/2001
JP         2012-045065 A     3/2012
(Continued)

OTHER PUBLICATIONS

International Search Report in application No. PCT/KR2018/012112 dated Jan. 17, 2019.
(Continued)

*Primary Examiner* — Natalie Huls
*Assistant Examiner* — Cynthia L Davis
(74) *Attorney, Agent, or Firm* — Maschoff Brennan

(57) ABSTRACT

A signal translating method may include, according to one aspect of the present application, receiving a source signal of a first domain; identifying erroneous features and effective features from the source signal; translating the source signal of the first domain into a first virtual signal of a second domain, the first virtual signal is that in which erroneous features included in the source signal has been removed; and outputting the first virtual signal. Therefore, the virtual signal of the second domain in which the erroneous features removed may be output.

7 Claims, 12 Drawing Sheets

(51) Int. Cl.
*G06V 40/20* (2022.01)
*G06F 18/211* (2023.01)
*G06F 18/2411* (2023.01)
*G06F 18/2135* (2023.01)
*G06V 10/771* (2022.01)
*G06V 10/77* (2022.01)
*G06V 10/82* (2022.01)
*G06T 11/00* (2006.01)
*G06N 20/00* (2019.01)
*G06N 3/02* (2006.01)

(52) U.S. Cl.
CPC .......... *G06F 18/2411* (2023.01); *G06F 40/40* (2020.01); *G06T 11/003* (2013.01); *G06V 10/771* (2022.01); *G06V 10/7715* (2022.01); *G06V 10/82* (2022.01); *G06V 40/20* (2022.01); *G06F 2218/10* (2023.01); *G06F 2218/14* (2023.01); *G06N 3/02* (2013.01); *G06N 20/00* (2019.01)

(58) Field of Classification Search
CPC .... G06K 9/6248; G06T 11/003; G06N 20/00; G06N 3/02; G06N 3/084; G06N 3/0481; G06N 3/0454; G06N 3/0445; G06F 40/40; G06V 10/25; G06V 40/20; G06V 10/771; G06V 10/82
See application file for complete search history.

(56) References Cited

U.S. PATENT DOCUMENTS

| | | |
|---|---|---|
| 2012/0053464 A1 | 3/2012 | Murashita |
| 2013/0016890 A1 | 1/2013 | Lee et al. |
| 2015/0213597 A1 | 7/2015 | Oh et al. |
| 2017/0185871 A1 | 6/2017 | Zhang et al. |
| 2018/0068463 A1* | 3/2018 | Risser ................ G06T 7/45 |
| 2018/0082715 A1* | 3/2018 | Rymkowski ....... G06K 9/00718 |
| 2018/0173997 A1* | 6/2018 | Shen .................... G06K 9/6227 |
| 2018/0322662 A1* | 11/2018 | Hellier ................ G06T 11/001 |
| 2019/0213444 A1* | 7/2019 | Zheng ................. G06K 9/3233 |

FOREIGN PATENT DOCUMENTS

| | | |
|---|---|---|
| JP | 2016-191975 A | 11/2016 |
| KR | 10-2013-0008858 A | 1/2013 |
| KR | 10-2015-0089836 A | 8/2015 |
| KR | 10-2017-0078516 A | 7/2017 |
| KR | 10-2017-0113251 A | 12/2017 |

OTHER PUBLICATIONS

KR Office Action in Application No. 10-2018-0120762 dated Jan. 31, 2020.
KR Notice of Allowance in Application No. 10-2018-0120762 dated Dec. 10, 2020.

* cited by examiner

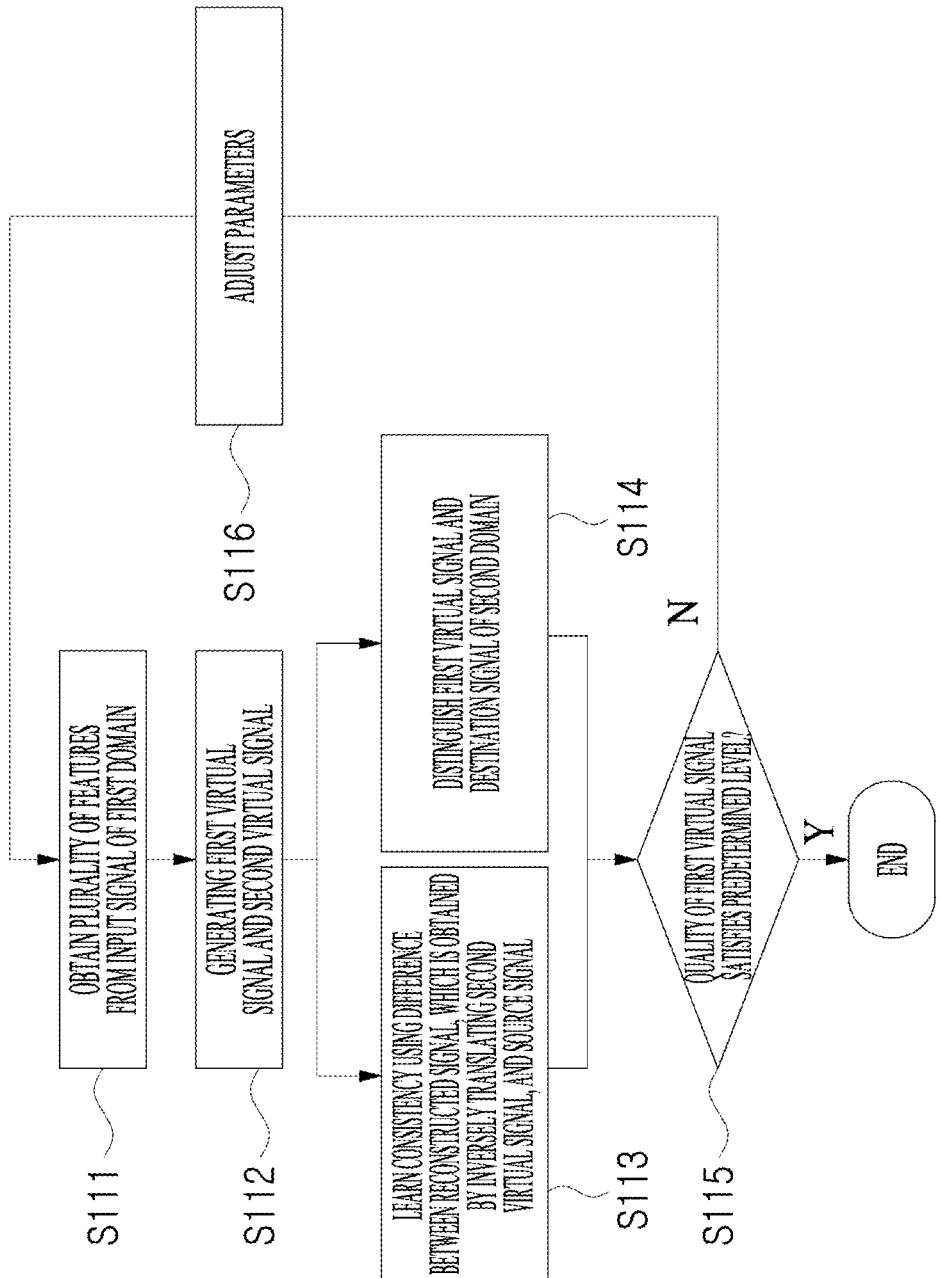

SIGNAL TRANSLATION SYSTEM AND SIGNAL TRANSLATION METHOD

CROSS-REFERENCE TO RELATED APPLICATION

This application claims priority to and the benefit to U.S. Provisional Application No. 62/572,507, which was filed on Oct. 15, 2017, Korean Patent Application No. 10-2018-0050390, which was filed on May 2, 2018 and Korean Patent Application No. 10-2018-0120762, which was filed on Oct. 10, 2018, the disclosure of which is incorporated herein by reference in its entirety.

BACKGROUND

1. Field of the Invention

The present application relates to a signal translation system and a signal translation method, and more particularly, to a signal translation system for generating a virtual signal of a second domain, from which erroneous features contained in an input signal of a first domain removed.

2. Discussion of Related Art

Machine learning is one field of artificial intelligence, which is a field that develops and uses algorithms and techniques so that computers learn features of data using multiple pieces of data. The machine learning is being applied to various fields and character recognition is the most representative example of the machine learning.

Machine learning can be classified into supervised learning, unsupervised learning, and reinforcement learning according to a learning method. In the supervised learning, a model is trained using a pair of pre-constructed learning input and output data. In the unsupervised learning, a model is trained by analyzing or clustering pieces of data itself using only input data. In the reinforcement learning, a model is trained through feedback by providing appropriate compensation to a result of the learning.

Recently, deep learning technology is being focused on as one field of machine learning that attempts to achieve a high level of abstraction by a combination of various nonlinear techniques in which computers can process data. The deep learning technology is being used in various fields such as object recognition and obstacle sensor research for vehicles.

SUMMARY OF THE INVENTION

The present application is directed to providing a virtual signal generated in consideration of erroneous features included in a source signal by translation between signals in different domains.

A signal translating method may include, according to one aspect of the present application, receiving a source signal of a first domain; identifying erroneous features and effective features from the source signal; translating the source signal of the first domain into a first virtual signal of a second domain, the first virtual signal is that in which erroneous features included in the source signal has been removed; and outputting the first virtual signal.

The first virtual signal is generated using pre-trained parameters in order to translate the first virtual signal from which the erroneous features of the source signal removed.

The pre-trained parameters are continuously updated to improve the quality of the virtual signal.

The method may also include determining whether the quality of the first virtual signal satisfies a predetermined level, wherein the first virtual signal outputs if the quality of the first virtual signal is determined to satisfy the predetermined level.

The method may also include, if the quality of the first virtual signal is determined to unsatisfied the predetermined level, inverting the first virtual signal to a first reconstruction signal of the first domain; and generating a second virtual signal from the first reconstruction signal as an input signal, wherein the above steps are repeated until the quality of the virtual signal satisfy the predetermined level.

The second virtual signal is that in which at least one second erroneous features included in the source signal further removed.

The first virtual signal is generated by combining the source signal of the first domain into features of a destination signal within the second domain.

The effective features are associated with a region of interest (ROI) in the source signal, preset from a user.

A signal translating method using at least one neural network may include, according to another aspect of the present application, identifying at least one first erroneous features from a source signal of a first domain; calculating a first virtual signal of a second domain from which the first erroneous features included in the source signal has been removed; and determining if the quality of the first virtual signal satisfies a predetermined level.

The method may also include, when the quality of the first virtual signal does not satisfy the predetermined level, inverting the first virtual signal to a first reconstruction signal of the first domain; and calculating a first weight using the difference between the first reconstruction signal and the source signal such that the neural network learns at least one first erroneous feature through the first weight.

The method may also include, when the quality of the first virtual signal does not satisfy the predetermined level, generating a second virtual signal of a second domain including the first erroneous features using the first weight; inverting the second virtual signal to a second reconstruction signal of the first domain; and adjusting parameters of the neural network using the difference between the second reconstruction signal and the source signal.

The identifying step may further include obtaining one or more features from the source signal; and classifying the features into a first feature associated with the effective features and a second feature associated with the erroneous features.

The second virtual signal is generated by applying the first weight to the first error signal calculated from the at least one first erroneous feature and applying a second weight to the first virtual signal.

The second weight is calculated based on the first weight.

The method may further include calculating the similarity between the first virtual signal and a destination signal of the second domain, wherein the neural networks are learned to increase the similarity between the first virtual signal and the destination signal.

A method of learning that is performed using at least one neural network may include, according to another aspect of the present application, obtaining a plurality of features from an input signal of a first domain; generating a first virtual signal of a second domain using only a first feature among the plurality of features and a second virtual signal using the plurality of features; calculating the similarity between the first virtual signal and a destination signal of the second domain; and adjusting parameters for the neural network using the difference between a first reconstruction signal inverted from the second virtual signal and the source signal.

The steps from above are repeated until the quality of the first virtual signal reaches the predetermined level.

The neural networks are learned to increase the similarity between the first virtual signal and the destination signal.

The similarity is a likeness of qualitative characteristics between the first virtual signal and the destination signal.

A non-transitory computer readable medium according to another aspect of the present application stores a program causing a computer to execute the methods described herein.

BRIEF DESCRIPTION OF THE DRAWINGS

The above and other objects, features and advantages of the present application will become more apparent to those of ordinary skill in the art by describing exemplary embodiments thereof in detail with reference to the accompanying drawings, in which:

FIG. 12 is a flowchart for describing an example of a learning method according to the fifth embodiment of the present application.

DETAILED DESCRIPTION OF EXEMPLARY EMBODIMENTS

Figure 1:
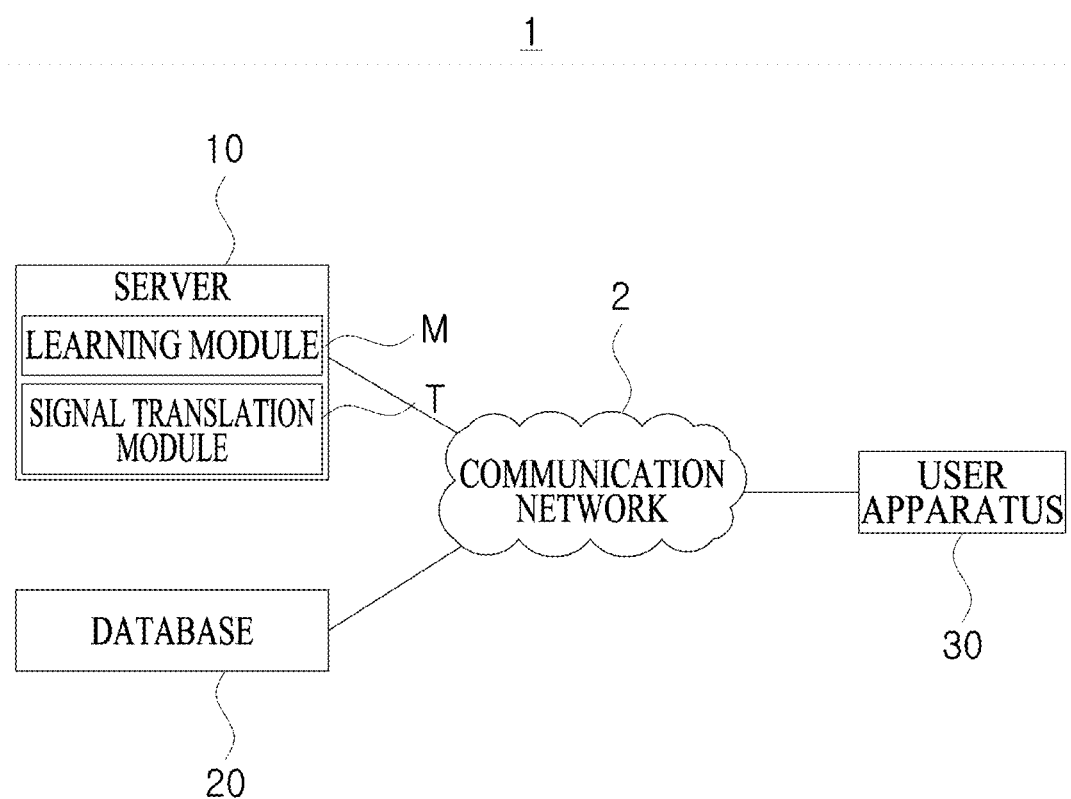
FIG. 1 is a schematic diagram for describing an entire environment of a signal translation providing system according to an embodiment of the present application.

The above-described objects, features, and advantages of the present application will be clear from the following detailed descriptions in connection with the accompanying drawings. However, while the present application is susceptible to various modifications and alternative forms, specific embodiments thereof are shown by way of example in the drawings and will herein be described in detail.

In the drawings, thicknesses of layers and regions are exaggerated for clarity. In addition, it will be understood that when an element or a layer is referred to as being "disposed on" another element or another layer, it can be directly disposed on another element or another layer or intervening elements may be present. Like reference numerals principally refer to like elements throughout the specification. In addition, the same reference numerals are used to designate the same components having the same function in the scope of the same ideology shown in the drawings of the respective embodiments.

When it is determined that detailed descriptions or configurations of related well-known functions may unnecessarily obscure the gist of the present application, the detailed descriptions thereof will be omitted. Numbers (for example, first, second, etc.) used in the description of the specification are used only to identify one element from another element.

A suffix "unit" or "portion" of an element used herein is assigned or incorporated for convenience of specification description, and the suffix itself does not have a distinguished meaning or function.

Hereinafter, embodiments related to signal translation between various signals in different domains will be described.

The signal translation according to the embodiments of the present application may relate to signal translation between an input signal of a first domain and a virtual signal of a second domain.

In this specification, signals may include, for example, images, voice, three-dimensional (3D) information, and the like. In addition, in this specification, an erroneous feature may be any feature included in an input signal that a user does not want.

As an example of voice signal translation, a male voice of a first domain may be translated into a female voice of a second domain. In this case, noise and other voices may be included in the male voice of the first domain, and the translated virtual signal may be a signal in which the noise and other voices included in the signal of the first domain are removed.

As another example, in the case of natural language signal translation, a Korean sentence of the first domain may be translated into an English sentence of the second domain. In this case, mistyped words and erroneous words may be included in the Korean sentence of the first domain, and the translated virtual signal may be a signal in which the mistyped words and erroneous words included in the signal of the first domain are removed.

As an example of sound signal translation, classical music of the first domain may be translated into jazz music of the second domain. In this case, noises and human voices (not vocals) may be included in the classical music of the first domain, and the translated virtual signal may be a signal in which the noises and human voices included in the signal of the first domain are removed.

As another example, in the case of 3D signal translation, a 3D voxel of the first domain may be translated into a two-dimensional (2D) image of the second domain. In this case, erroneous features may be included in the 3D voxel of the first domain, and the translated virtual signal may be a signal in which the erroneous features included in the signal of the first domain are removed.

In addition, as an example of image translation, an ultrasound image of the first domain may be translated into a photographic image of the second domain. In this case, errors or features that a user does not want may be included in the ultrasound image of the first domain, and the translated virtual signal may be a signal in which the errors or unwanted features included in the signal of the first domain are removed.

The above-described examples of the signal translation are described for illustrative purposes only, and the present application is not limited thereto. In signal translation between signals in different domains, the above-described examples may be utilized in all fields for translating a source signal of a first domain including an error signal into a virtual signal of a second domain, which is produced by removing the error signal of the source signal of the first domain.

Hereinafter, for convenience of description, image translation for outputting a virtual image of a second domain using an image of a first domain as an input signal will be described.

In this case, an input image may be an image obtained using various imaging apparatuses.

For example, the input image may be a medical image obtained using an X-ray apparatus, a computed tomography (CT) apparatus, a magnetic resonance imaging (MM) apparatus, an ultrasound imaging apparatus, or the like. Alternatively, for example, the input image may be a photographic image captured using various types of camera devices or the like.

Further, a virtual image may be an image of a second domain including at least one region of interest (ROI) of a user in an input image of a first domain.

For example, the virtual image may be an image of the second domain, which is produced by removing at least one artifact included in the input image of the first domain.

The artifacts may be, for example, various types of imaging errors included in the input image. Alternatively, the artifacts may be unwanted features of the user. The user may define unwanted features included in the input image as artifacts.

1. Signal Translation Providing System

Hereinafter, an entire environment of a signal translation providing system 1 for providing a virtual signal which is translated using various signal translation manners described above will be schematically described with reference to FIGS. 1 and 2.

The signal translation providing system 1 according to the embodiment of the present application may be a system for translating a source signal of a first domain input from a user apparatus 30 into a virtual signal of a second domain and providing the virtual signal to the corresponding user apparatus 30.

Further, the signal translation providing system 1 may be a pre-trained system in order to provide a virtual signal which is produced by removing erroneous features in the source signal.

FIG. 1 is a schematic diagram for describing an entire environment of the signal translation providing system 1 according to the embodiment of the present application.

The signal translation providing system 1 according to the embodiment of the present application may include a server 10, a database 20, a user apparatus 30, and the like. The server 10, the database 20, the user apparatus 30, and the like may be connected to each other via a communication network 2. Further, the signal translation providing system 1 may include one or more servers 10, databases 20, and user apparatuses 30.

The server 10 may be an apparatus for translating the source signal of the first domain received from the user apparatus 30 into the virtual signal of the second domain and providing the virtual signal to the user apparatus 30.

For example, the server 10 may comprise a learning module M which is trained in order to generate a virtual signal which does not include erroneous features in the source signal, and a signal translation module T which performs a signal translation operation on the basis of a predetermined criterion obtained by the learning module M.

The learning module M and the signal translation module T are exemplarily described for convenience of description. The server 10 may provide all functions of the learning module M and the signal translation module T as one integrated module. Also, other functions which are needed to generate and provide the virtual signal may be provided by the server 10. Detailed operations performed by the learning module M and the signal translation module T will be described in the following related section.

Further, for example, the server 10 may comprise a memory and one or multiple processors for performing signal processing.

A memory (not shown) stores a program for signal processing and the program may include one or more modules.

One or more machine learning algorithms for performing machine learning may be provided in the processor (not shown). Particularly, various machine learning models may be used for signal processing according to the embodiment of the present application, for example, a deep learning model may be used.

The deep learning is a set of algorithms that try to achieve a high level of abstraction by a combination of several nonlinear translation techniques. A deep neural network (DNN) may be utilized as a main model for deep learning. The DNN may include several hidden layers between an input layer and an output layer, and may be classified into a deep belief network (DBN), a deep auto encoder, a convolutional neural network (CNN), a recurrent neural network (RNN), a generative adversarial network (GAN), and the like according to a learning method or structure. Here, the learning determines features of data for a given purpose, and deep learning adjusts a connection weight thereof. For example, the CNN, which can be applied for learning of 2D data, such as an image, may consist of one or more convolutional layers and a pooling layer and may consist of fully connected layers and may be trained using a backpropagation algorithm.

For example, through the processor, the input signal of the first domain received from the user apparatus 30 may be translated into the virtual signal of the second domain using one or more of the above machine learning algorithms.

Meanwhile, the server 10 may only perform a signal translation operation on the basis of a predetermined criterion transmitted through the learning module M located in the outside thereof. Alternatively, the server 10 may perform only a signal translation learning operation and provide a predetermined criterion, which is calculated as a result of the learning, to an external signal translation module T. Alternatively, the server 10 may provide only a virtual signal translated by the external learning module M and signal translation module T to the user.

Hereinafter, an example case in which the learning module M and the signal translation module T are all located in the server 10 and the server 10 uses the neural network NN described above, an extension thereof, or other deep learning approaches to perform signal translation will be described for convenience of description. In this case, the translated virtual signal may be a signal which is generated by removing at least one erroneous feature included in the input signal.

The database 20 may include one or more memories as components for storing various types of data.

For example, the database 20 may store one or more signals received from the user apparatus 30 and store various types of data generated during a signal translation process.

Further, the database 20 may store one or more signals obtained from an external server or an external database, for example, feature information of an image, voice, or 3D information, and the like.

Meanwhile, the database 20 may be located in the server 10 described above, or may be located separately from the server 10.

The user apparatus 30 may be an electronic apparatus for obtaining an image, voice, 3D information, and the like of a specific object. For example, the user apparatus 30 may be a camera, an X-ray apparatus, an MIll apparatus, an ultrasound imaging apparatus, a computer, a portable terminal, or the like.

Alternatively, the user apparatus 30 may be an electronic apparatus such as a computer, a portable terminal, or the like that receives a signal from an external apparatus. For example, the computer may include a desktop computer, a notebook computer, and the like. Alternatively, for example, the portable terminal may include a tablet computer, a smart phone, and the like.

For example, when the external apparatus is an ultrasound imaging apparatus, the user apparatus 30 may be a terminal used in a hospital which receives an image captured by the ultrasound imaging apparatus.

The user apparatus 30 may access the server 10 through a program installed in the user apparatus 30, a web site provided on the user apparatus 30, an application, or the like.

For example, the user apparatus 30 may provide at least one previously stored voice, natural language, music, image data, etc. to the server 10 as an input signal. Further, for example, the user apparatus 30 may provide at least one voice, natural language, music, image data, etc., which is obtained in real time through the user apparatus 30, to the server 10 as an input signal.

The communication network 2 may be various types of wired or wireless communication networks for connecting the server 10 to the user apparatus 30. Alternatively, the communication network 2 may be a local area network or a wide area network.

For example, the communication network 2 may be a wired communication via a Universal Serial Bus (USB), or a wireless communication such as Wi-Fi, WiBro, Bluetooth, radio frequency (RF) communication, and Infrared Data Association (IrDA) communication. The communication network 2 is not limited to the above-described examples.

2. Signal Translation Process

Figure 2:
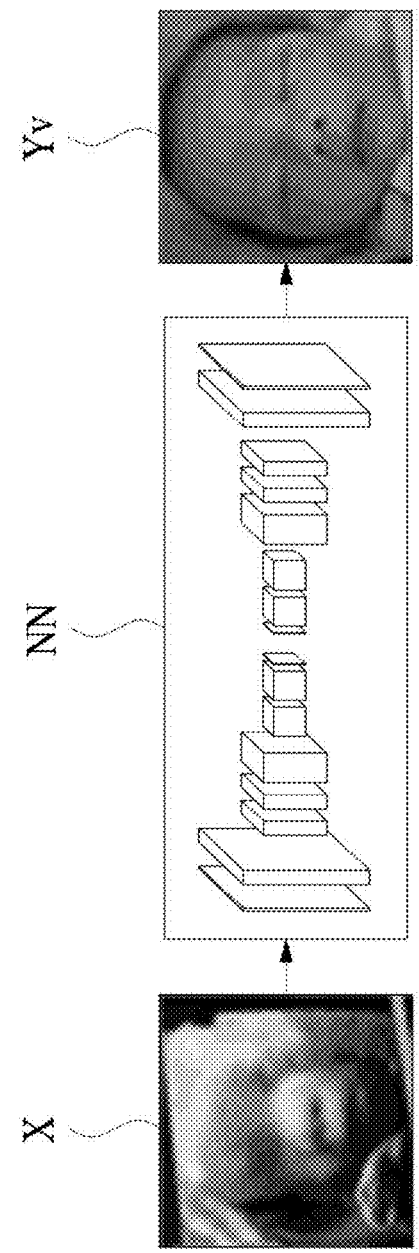
FIG. 2 is a diagram schematically showing a signal translation process provided in the signal translation providing system according to the embodiment of the present application.

FIG. 2 is a diagram schematically showing a signal translation process provided in the signal translation providing system 1 according to the embodiment of the present application.

For example, the signal translation process according to the embodiment of the present application may be performed by the signal translation module T located in the server 10 described above.

In this case, one or more machine learning algorithms may be provided in the signal translation module T. For example, the signal translation module T may perform signal translation using at least one neural network NN, as shown in FIG. 2. A detailed operation performed by the signal translation module T will be described with reference to the following related example.

Referring to FIG. 2, a source signal X of the first domain received from the user apparatus 30 described above may be applied to the neural network NN as input data. That is, when the ultrasound image X received from the user apparatus 30 is input to the neural network NN, a real photographic image Yv of the second domain translated using the neural network NN may be output to the user apparatus 30.

For example, the real photographic image Yv may be a virtual image of the second domain, which is produced by removing erroneous features in the ultrasound image X, such as a hand of a fetus and the like. In this case, the signal translation module T may generate a virtual image of the second domain, which is obtained by removing erroneous features included in the source image X of the first domain, according to a predesignated criterion. For example, the predesignated criterion may be a parameter obtained as a result of machine learning and the parameter may be continuously updated.

Hereinafter, embodiments of a signal translation method performed in the signal translation module T will be described in detail with reference to FIGS. 3 to 6.

Figure 3:
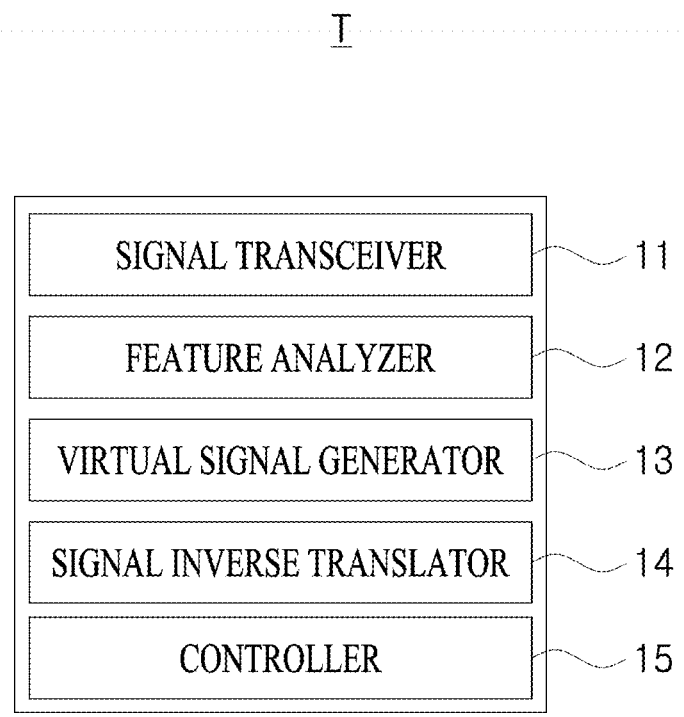
FIG. 3 is a block diagram showing an example of a configuration of a signal translation module according to the embodiment of the present application.

FIG. 3 is a block diagram showing an example of a configuration of the signal translation module T according to the embodiment of the present application. For example, the signal translation module T may include a signal transceiver 11, a feature analyzer 12, a virtual signal generator 13, a signal inverse translator 14, and a controller 15. Each of the components is exemplarily described and the signal translation module T may include one or more components among the above-described components. Operations performed by the components may be integrated into one operation of a single component. Further, the operations performed by the components may be performed in a sequential manner or in a parallel manner as necessary.

Hereinafter, an example case in which a source signal of the first domain is an ultrasound image of a fetus and a destination signal of the second domain is a real photographic image of a newborn baby will be described.

In this case, a virtual signal of the second domain may be a synthesized image obtained by combining the ultrasound image of the fetus and features of the real photographic image of the newborn baby. Further, the virtual signal may be a photographic image of the fetus in which at least one artifact included in the ultrasound image of the fetus are removed.

Here, the artifact may be, for example, various types of imaging errors included in the ultrasound image of the fetus and any feature rather than a facial region of the fetus.

Hereinafter, the facial region of the fetus is defined as an ROI of the user and a region including at least one artifact included in the ultrasound image of the fetus is defined as an error region.

Further, the ultrasound image of the fetus may be a 2D or 3D image of the fetus captured by an ultrasound imaging apparatus, and the real photographic image of the newborn baby may be a 2D image obtained by actually capturing an image of the newborn baby. Meanwhile, in signal processing according to the embodiment of the present application, the fetus of the ultrasound image and the newborn baby of the real photographic image may not coincide with each other.

The signal transceiver 11 may be a component for receiving a source signal X of the first domain from the user and transmitting a virtual signal of the second domain generated in the virtual signal generator 13 which will be described below in the user apparatus 30.

For example, when the source signal X of the first domain is the ultrasound image of the fetus, the source signal X may be an image received in real time from an ultrasound imaging apparatus. Or, the source signal X may be an image selected by the user among images stored in a portable terminal of the user.

The feature analyzer 12 may be a component for extracting a plurality of features in the source signal X of the first domain obtained by the signal transceiver 11.

For example, the feature analyzer 12 may extract the plurality of features in the source signal X using at least one neural network. For example, the neural network may be a convolution network and may include a plurality of layers. Therefore, the feature analyzer 12 may extract the plurality of features included in the source signal X using the plurality of layers.

Further, the feature analyzer 12 may classify the plurality of features into effective features associated with an ROI and/or erroneous features associated with an error region according to a preset criterion. The preset criterion may be, for example, a criterion which is previously entered by the user and may be updated according to a result previously trained by the learning module M.

For example, the feature analyzer 12 may identify the ROI and the error region in the source signal using one or more feature maps (FMs). In this case, the FM may be a combination of the plurality of features.

As an example, when the source signal X is the ultrasound image of the fetus, the ROI may be a facial region of the fetus and the error region may be other body regions of the fetus rather than the facial region. For example, the facial region may include an eye, a nose, a mouth, an ear, or the like of the fetus. For example, the error region may include a hand, a foot, a placenta, amniotic fluid, or the like of the fetus.

Additionally, the feature analyzer 12 may extract features of the destination signal of the second domain. In this case, a method of extracting features of the destination signal may correspond to a method of extracting features in the source signal.

Further, optionally, the signal translation module T may provide a list of the effective features and/or the erroneous features which are analyzed by the feature analyzer 12, through the user apparatus 30. For example, the user may select one of the features of the list and change attribute information. For example, the attribute information may include skin color, hair color, and the like.

The virtual signal generator 13 may be a component for translating the source signal of the first domain into a first virtual signal of the second domain using one or more features obtained by the feature analyzer 12 described above.

For example, the virtual signal generator 13 may translate the source signal into the first virtual signal of the second domain using at least one neural network. For example, the neural network may include a plurality of layers, and the virtual signal generator 13 may apply pre-trained parameters to the plurality of layers and generate the first virtual signal.

The pre-trained parameters may be parameters previously trained by the learning module M so as to generate the first virtual signal having the quality of a predetermined level or higher. A process of calculating the parameters will be described below in a portion with respect to a learning method performed in the learning module M.

Further, for example, the virtual signal generator 13 may recombine the features of the destination signal necessary for the signal translation on the basis of the effective features of the source signal and may combine the effective features of the source signal and the recombined features of the destination signal to translate the source signal of the first domain into the first virtual signal of the second domain. In this case, the first virtual signal translated by the virtual signal generator 13 may be a signal which is generated by removing at least one erroneous feature in the source signal.

For example, the features of the destination signal may include brightness, color, reflection color, texture, a depth, blending, a shape, or a combination of shapes of the image.

Meanwhile, the destination signal and/or the features of the destination signal may be obtained from the feature analyzer 12, the database 20, the memory, or the external server described above. Alternatively, the virtual signal generator 13 may extract the features of the destination signal using the neural network, and a process of extracting features of the destination signal may correspond to the method of extracting features in the source signal in the feature analyzer 12 described above.

For example, when the source signal is the ultrasound image of the fetus, the erroneous features included in the ultrasound image of the fetus may be identified according to the predesignated criterion and the virtual signal generator 13 produce a virtual image by removing the erroneous features. In this case, the virtual image generated by the virtual signal generator 13 may be a real photographic image of the second domain, in which the erroneous features such as a hand, a foot, a placenta, and the like of the fetus in the ultrasound image are removed.

As another example, when the user selects one of the features on the list of the effective features and/or the effective features provided in the user apparatus 30 and requests to change attribute information, the virtual signal generator 13 may produce a virtual signal by reflecting the attribute information change request.

Additionally, the virtual signal generator 13 may generate a second virtual signal using a reconstructed signal, which is translated by the signal inverse translator 14 described below, as an input signal. A method of generating the second virtual signal using the reconstructed signal as an input signal may correspond to the method of generating the first virtual signal described above.

The signal inverse translator 14 may be a component for inversely translating the first virtual signal of the second domain generated by the virtual signal generator 13 described above into a reconstruction signal of the first domain.

For example, the signal inverse translator 14 may inversely translate the first virtual signal into the reconstructed signal of the first domain using at least one neural network. In this case, the process of inversely translating the first virtual signal into the reconstructed signal of the first domain may correspond to the signal translation operation performed in the virtual signal generator 13 described above.

For example, the neural network may include two subnetworks and the signal inverse translator 14 may extract the plurality of features included in the first virtual signal using a plurality of layers included in a first subnetwork. In this case, the process of extracting the plurality of features using the first subnetwork, which is performed by the signal inverse translator 14, may correspond to the operation performed in the feature analyzer 12 described above. In this case, the process of generating the reconstructed signal, which is performed by the signal inverse translator 14, may correspond to the operation performed in the virtual signal generator 13 described above.

That is, the signal inverse translator 14 may map the features of the source signal of the first domain to the plurality of features using a plurality of layers included in a second subnetwork to generate the reconstruction signal.

Meanwhile, since the first virtual signal is a signal which is obtained by removing at least one erroneous feature included in the source signal, the reconstructed signal generated by the signal inverse translator 14 may also be a signal which is obtained by removing the at least one erroneous feature.

For example, the controller 15 which will be described below may control the signal translation and inverse translation processes to be repeatedly performed by the virtual signal generator 13 and the signal inverse translator 14 described above until the quality of the virtual signal satisfies a predetermined level so that the erroneous features included in the source signal may be gradually removed in a step-wise manner. Detailed descriptions of the signal translation and inverse translation processes will be described in detail with reference to the following related embodiment.

The controller 15 may be a component for identifying error signals included in the source signal input by the user and controlling all the operations performed in the signal translation module T so as to generate the virtual signal of the second domain having improved quality.

For example, the controller 15 may obtain optimal parameters calculated by the learning module M and transmit the parameters to the feature analyzer 12, the virtual signal generator 13, and/or the signal inverse translator 14 described above.

Further, for example, the controller 15 may control so that the virtual image of the second domain, which is finally translated by the virtual signal generator 13, is output to the user apparatus 30 through the signal transceiver 11.

Further, for example, the controller 15 may further determine whether the quality of virtual signal generated by the virtual signal generator 13 satisfies a predetermined level.

Here, the predetermined level may be a level previously input by the user. For example, the user may set the virtual signal generator 13 and the signal inverse translator 14 so that the operations performed thereby repeat a predetermined number of times or more. The quality of the virtual signal may be determined by various criteria according to a type of signal, and detailed descriptions related thereto will be described in detail with reference to the following embodiment.

As an example, when it is determined that the quality of the virtual signal satisfies the predetermined level, the controller 15 may control so that the virtual image is output to the user apparatus 30 through the signal transceiver 11.

Alternatively, when it is determined that the quality of the virtual signal does not satisfy the predetermined level, the controller 15 may transmit the virtual signal to the signal inverse translator 14 described above.

That is, the controller 15 may control the operations of the virtual signal generator 13 and the signal inverse translator 14 so that the signal translation and inverse translation processes are repeatedly performed until the quality of the virtual signal generated by the virtual signal generator 13 satisfies the predetermined level, and thus the erroneous features included in the source signal may be removed.

Hereinafter, various embodiments of the signal translation method performed by the signal translation module T described above will be described with reference to FIGS. 4 and 5.

Figure 4:
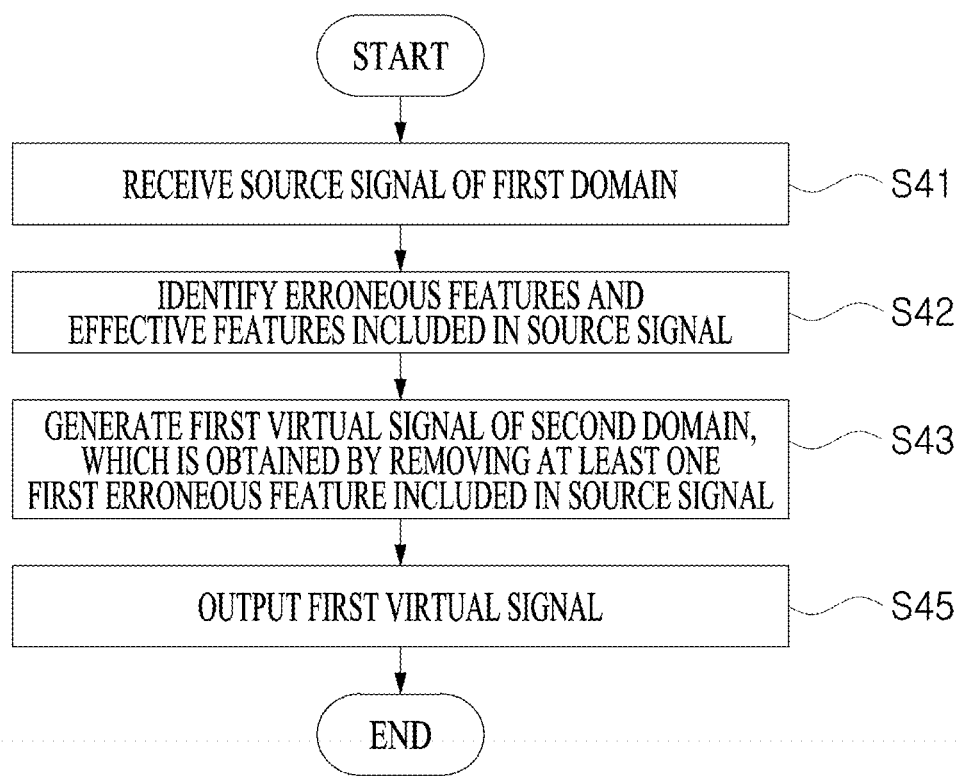
FIG. 4 is a flowchart for describing an example of a signal translation method according to a first embodiment of the present application.

FIG. 4 is a flowchart for describing an example of a signal translation method according to a first embodiment of the present application. Referring to FIG. 4, the signal translation method according to the first embodiment of the present application may include receiving a source signal of a first domain (S41), identifying erroneous features and effective features included in the source signal (S42), generating a first virtual signal of a second domain, which is obtained by removing at least one first erroneous feature included in the source signal (S43), and outputting the first virtual signal (S45).

In the following, an example case in which a source signal of the first domain is an ultrasound image X of a fetus and a virtual signal of the second domain is an image Yv obtained by combining the ultrasound image of the fetus and features of a real photographic image of a newborn baby will be described in detail.

The signal translation module T may receive the source signal of the first domain as an input (S41).

As described with reference to FIG. 3, the signal translation module T may receive a source signal X of the first domain from the user through the signal transceiver 11. For example, the signal translation module T may receive an ultrasound image of a fetus from an ultrasound imaging apparatus located in a hospital.

The signal translation module T may identify the erroneous features and effective features included in the source signal (S42).

For example, the signal translation module T may extract a plurality of features included in the source signal using the feature analyzer 12 as described above. Further, for example, the feature analyzer 12 may classify the plurality of features into effective features and/or erroneous features according to a preset criterion.

The signal translation module T may generate the first virtual signal of the second domain, which is obtained by removing at least one first erroneous feature included in the source signal (S43).

For example, the signal translation module T may translate the source signal of the first domain into the first virtual signal of the second domain by reflecting at least one first erroneous feature identified in step S42. For example, the at least one first erroneous feature may be a feature associated with a hand, a foot, a placenta, amniotic fluid, or the like included in the ultrasound image of the fetus.

Further, for example, the signal translation module T may generate the first virtual signal using pre-trained parameters. In this case, the pre-trained parameters may be continuously updated to improve the quality of the first virtual signal.

For example, the virtual signal generator 13 may recombine the features (e.g., brightness, color, reflection color, texture, depth, blending, shape, or combination of shapes of an image) of the real photographic image of the newborn baby necessary for signal translation except for the first erroneous features identified in step S42 among the plurality of features included in the ultrasound image of the fetus on the basis of the features (e.g., a face, an eye, a nose, a mouth, an ear, or the like of the fetus) of the facial region of the fetus. In this case, the virtual signal generator 13 may generate the first virtual signal by combining the features associated with the facial region of the fetus and the recombined features of the real photographic image.

The signal translation module T may output the first virtual signal to the user apparatus (S45).

For example, the signal translation module T may transmit the first virtual signal, which is generated by the virtual signal generator 13, through the signal transceiver 11 described above. In this case, the first virtual image provided on the user apparatus may be an image having improved quality which is obtained by removing the erroneous features included in the ultrasound image of the fetus.

Meanwhile, the signal translation module T may provide the user with a virtual signal having improved quality by repeatedly performing the above-described signal translation process at least twice. There are various criterions for repeatedly performing the signal translation process in the signal translation module T.

According to a signal translation method of a second embodiment, the signal translating process is repeated until the quality of the first virtual signal generated by performing the above-described steps S41 to S43 satisfies a predesignated criterion such that the virtual signal having the improved quality may provide to the user.

Namely, the signal translation method of the second embodiment of the present application determines whether the quality of the virtual signal reaches the predesignated criterion, and then the first virtual signal is provided through the user apparatus 30 only when it is determined that the quality of the first virtual signal reaches the predesignated criterion.

In other words, in the signal translation method according to the second embodiment of the present application, a step of determining whether the quality of the first virtual signal satisfies a preset level before outputting the first virtual signal generated in step S43 to the user apparatus 30 may be further performed so that the virtual signal having the quality of a predetermined level or higher may be provided to the user.

Figure 5:
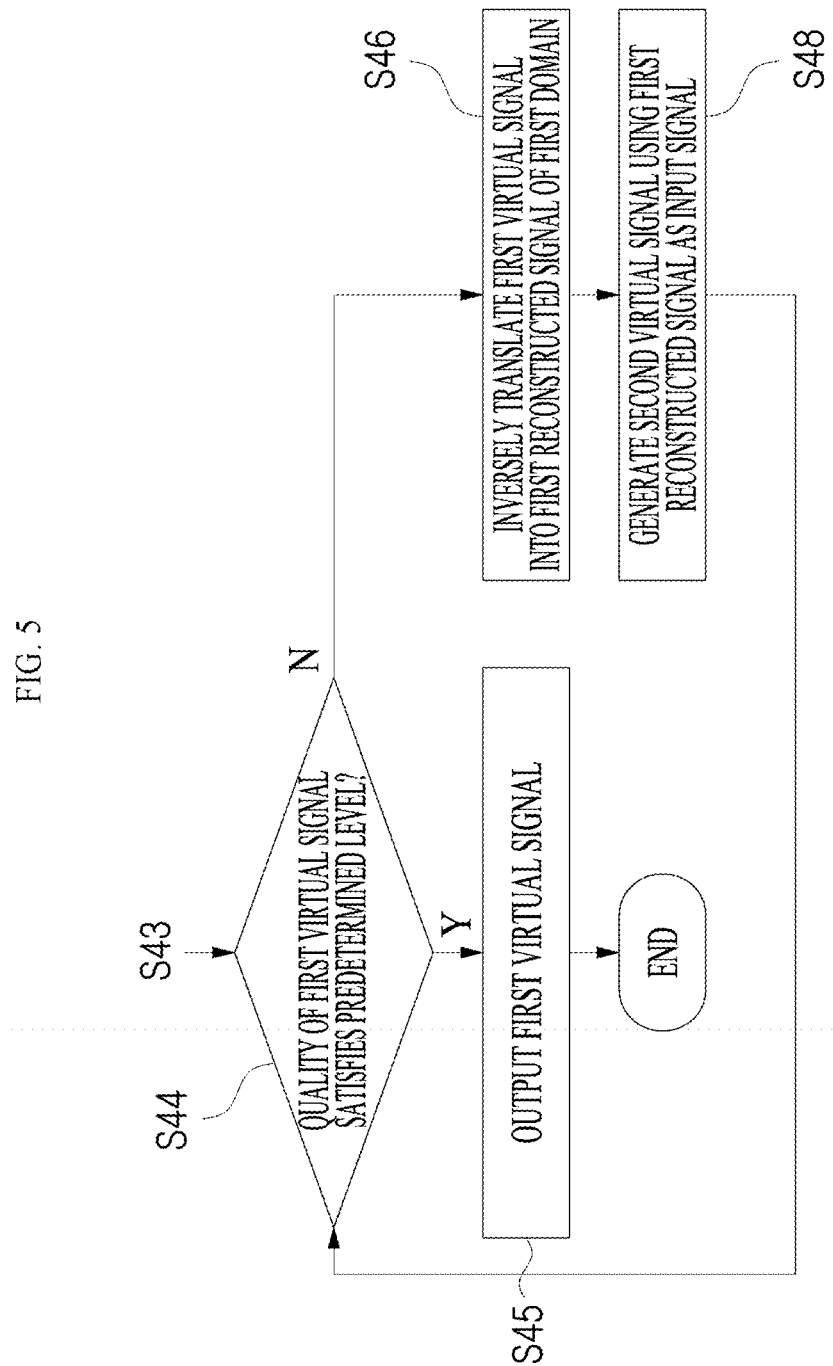
FIG. 5 is a flowchart for describing an example of a signal translation method according to a second embodiment of the present application.

FIG. 5 is a flowchart for describing an example of the signal translation method according to the second embodiment of the present application. Referring to FIG. 5, the signal translation method according to the second embodiment of the present application may further include determining whether the quality of the first virtual signal satisfies a predetermined level (S44), inversely translating the first virtual signal into a first reconstructed signal of the first domain (S46) when it is determined that the quality of the first virtual signal does not satisfy the predetermined level, and generating a second virtual signal using the first reconstructed signal as an input signal (S48).

The signal translation module T may determine whether the quality of the first virtual signal satisfies the predetermined level (S44).

That is, the above-described controller 15 may determine whether the quality of the first virtual signal generated in step S43 satisfies the predetermined level. In this case, it may be determined whether the quality of the first virtual signal satisfies the predetermined level on the basis of similarity between the first virtual signal and the destination signal of the second domain.

Here, the similarity may refer to a likeness of qualitative features between the virtual signal and the destination signal. For example, when the source signal is the ultrasound image of the fetus, the similarity may be expressed by a probability that the real photographic image of the fetus, which is generated by the virtual signal generator 13, corresponds to the real photographic image of the newborn baby.

For example, the controller 15 may calculate a probability that the first virtual image corresponds to a destination image, and when the probability that the first virtual image corresponds to the destination image is higher than or equal to a predetermined value, the controller 15 may determine that the quality of the first virtual signal satisfies the predetermined level. Therefore, the controller 15 may control so that the first virtual image is output to the user apparatus 30.

As another example, the controller 15 may calculate a probability that the first virtual image corresponds to the destination image, and when the probability that the first virtual image corresponds to the destination image is lower than the predetermined value, the controller 15 may determine that the quality of the first virtual signal does not satisfy the predetermined level.

In this case, the signal translation module T may inversely translate the first virtual signal into the first reconstruction signal of the first domain (S46).

As described above, the signal inverse translator 14 may map the features of the source signal of the first domain to the plurality of features included in the first virtual signal to generate the first reconstruction signal of the first domain. In this case, the first reconstruction signal may be a signal which is obtained by removing the above-described first erroneous features.

For example, when the source signal of the first domain is the ultrasound image of the fetus, the ultrasound image of the fetus may include effective features associated with the facial region, such as an eye, a nose, a mouth, an ear, or the like of the fetus and erroneous features associated with the error region, such as a hand, a foot, a placenta, amniotic fluid, etc. In this case, when the first erroneous feature is a feature associated with a placenta in the ultrasound image, the first virtual signal may be a real photographic image of the second domain which is obtained by removing the feature associated with the placenta in the ultrasound image. Therefore, in step S46, in the first reconstruction signal which is inversely translated by the signal inverse translator 14, the feature associated with the placenta in the ultrasound image may be removed.

The second virtual signal may be generated using the first reconstruction signal as an input signal (S48).

As described above, the virtual signal generator 13 may map the features of the destination signal of the second domain to the plurality of features included in the first reconstruction signal to generate the second virtual signal of the second domain.

For example, the process of generating the second virtual signal may correspond to the operation performed in step S42 and S43 described above.

For example, the signal translation module T may further identify at least one second erroneous feature in the first reconstructed signal and translate the first reconstructed signal into the second virtual signal of the second domain by considering the at least one second erroneous feature.

As another example, the signal translation module T may generate the second virtual signal from the first reconstructed signal using pre-trained parameters. In this case, the second virtual signal generated by the virtual signal generator 13 may not contain the second erroneous feature as well.

Therefore, in the signal translation method according to the second embodiment of the present application, the above-described steps may be repeatedly performed until the quality of the virtual signal satisfies the predetermined level so that a virtual signal having the quality of a certain level or higher may be provided to the user.

Figure 6:
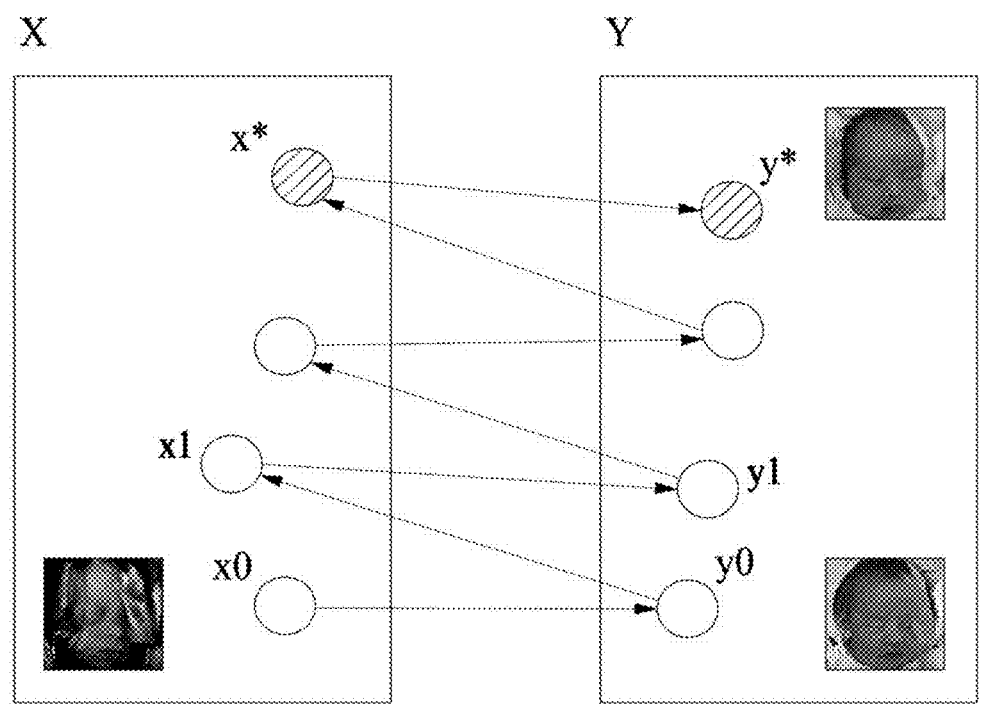
FIG. 6 is a diagram showing an example of the signal translation method according to the second embodiment of the present application.

For example, referring to FIG. 6, a first virtual image y0 which is formed by translating an ultrasound image x0 of a first domain into a real photographic image of a second domain may include a feature associated with a hand of a fetus among erroneous features in the source image x0. In this case, the controller 15 may determine that quality of the first virtual image y0 does not satisfy a predetermined level and transmit the first virtual image y0 to the signal inverse translator 14 so as to generate a first reconstruction image x1, which is obtained by inversely translating the first virtual image y0 into an image of the first domain. Further, the controller 15 may re-input the first reconstruction image x1 generated to the virtual signal generator 13 through the signal inverse translator 14 to re-translate the first reconstruction image x1 into a second virtual image y1 of the second domain.

Namely, as shown in FIG. 6, the controller 15 may sequentially and repeatedly perform the signal translation process using the virtual signal generator 13 and the signal inverse translation process using the signal inverse translator 14. As a result, the controller 15 may control the operation of the signal translation module T so that a virtual image y* having predetermined quality, which is obtained by removing the unwanted features included in the source image x0, is output.

According to a signal translation method of a third embodiment, the signal translating process is repeatedly performed a predetermined number of times in order to output a virtual signal having improved quality.

For example, the controller 15 generates a first virtual signal of the second domain in which at least one first erroneous feature included in the source signal has been removed in S43 and then determines whether the signal translation process has been performed the predetermined number of times.

If the controller 15 determines that the signal translation process has been performed the predetermined number of times, the first virtual signal is output to the user apparatus according to S45.

On the other hand, if the controller 15 determined that the signal translation process has not been performed the predetermined number of times, the controller 15 may return to S43 and control the operation of the virtual signal generator 13 to generate a second virtual signal. For instance, the virtual signal generator 13 generates the second virtual signal in which at least one second erroneous features included in the source signal also has been removed.

Or, if the controller 15 determined that the signal translation process has not been performed the predetermined number of times, the controller 15 may control the operation of the feature analyzer 12 and the virtual signal generator 13 to repeat the operation corresponding to the steps of S42 and S43.

Accordingly, the controller 15 may output the virtual signal having the predetermined level or higher of quality through the user device by controlling the signal translation process of the virtual signal generator 13 so as to repeat the signal translation process the predetermined number of times.

3. Signal Translation Learning Process

Hereinafter, a machine learning process for optimizing the signal translation operation described above will be described in detail with reference to FIGS. 7 and 8.

A machine learning process according to an embodiment of the present application may be performed by a learning module M located inside or outside the server 10 described above, and the learning module M may include one or more neural networks NN.

Figure 7:
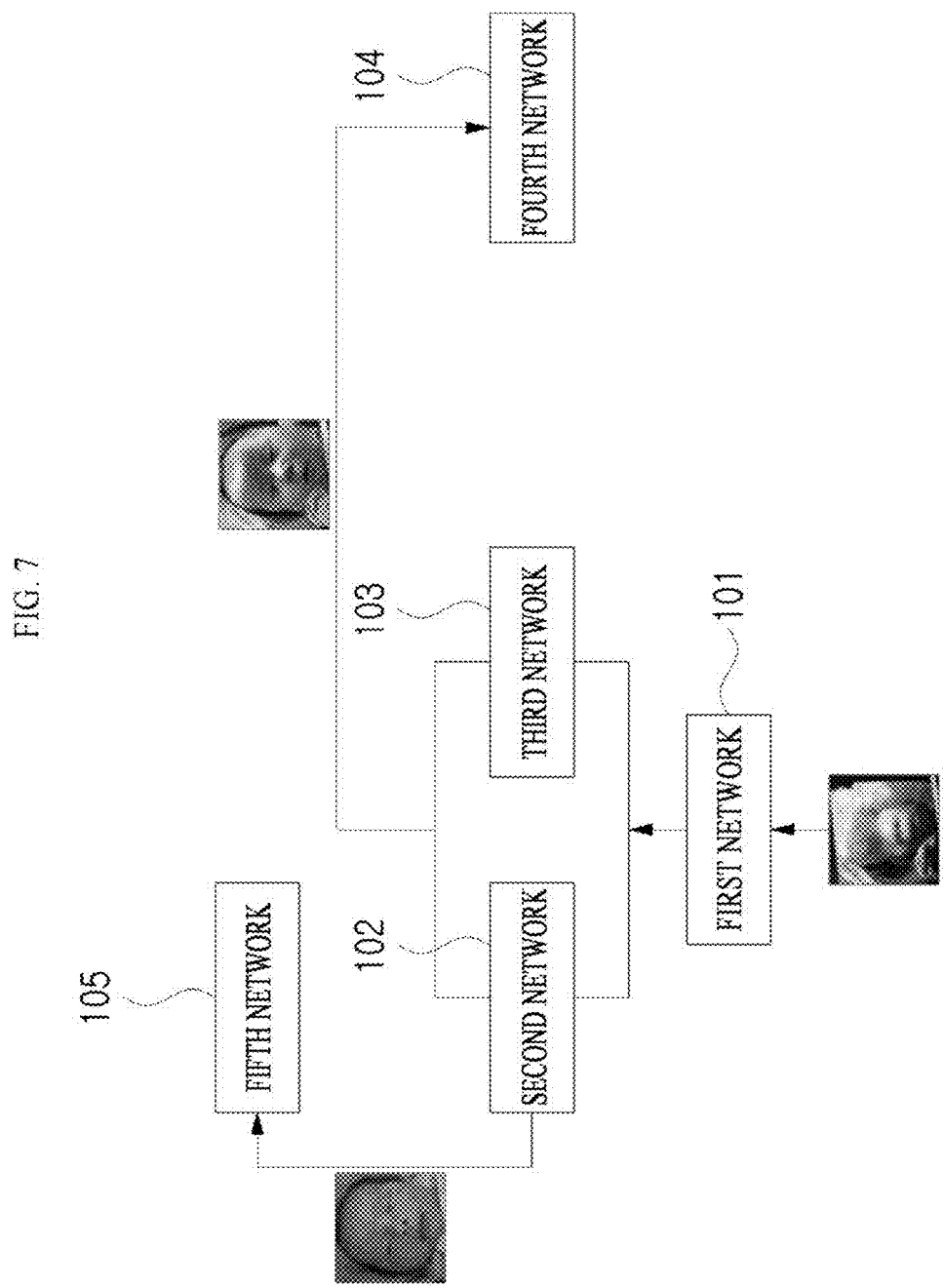
FIGS. 7 and 8 are diagrams for describing examples of a signal translation learning process performed by one or more neural networks (NN) according to an embodiment of the present application.
Figure 8:
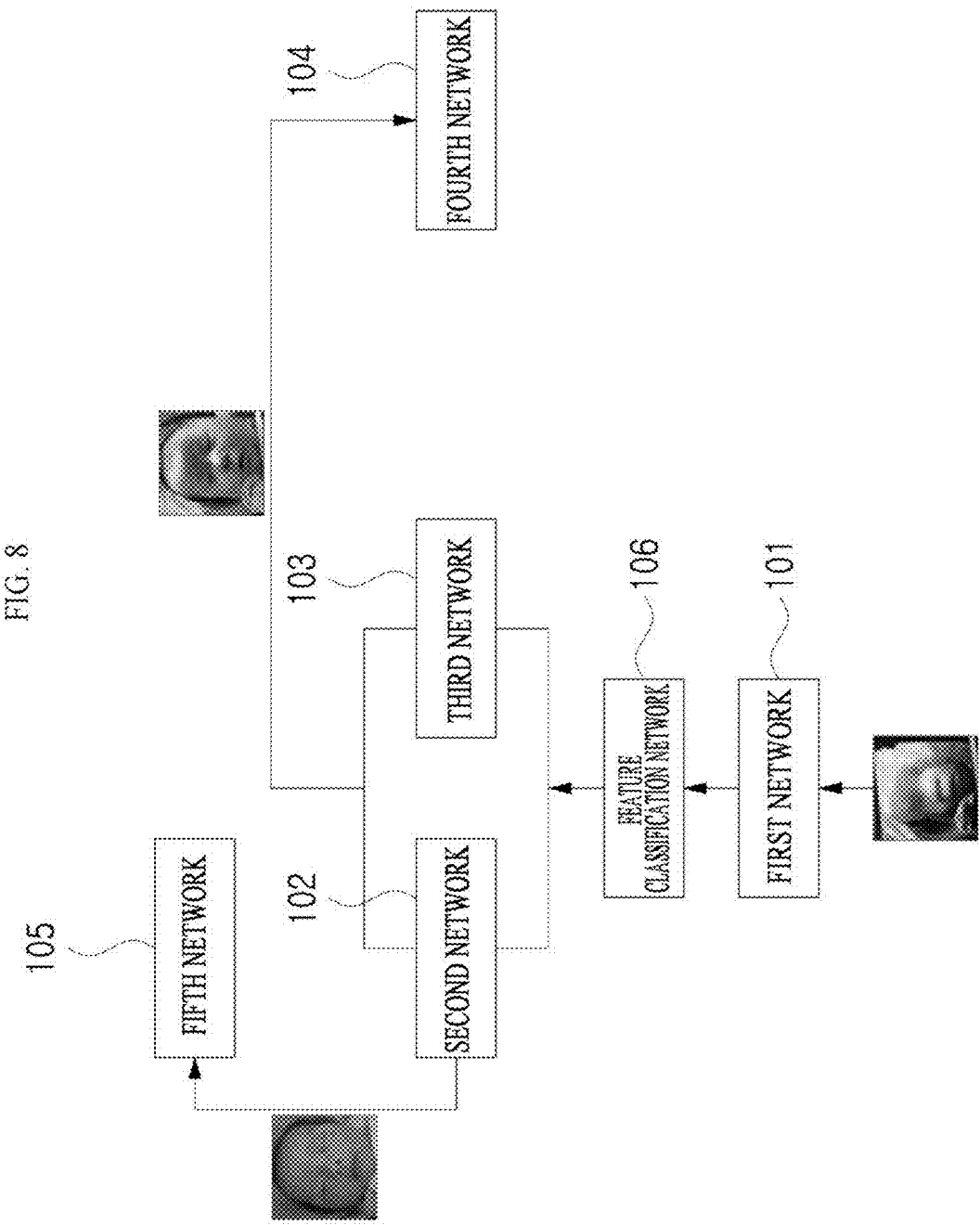

FIGS. 7 and 8 are diagrams for describing examples of a signal translation learning process performed by one or more neural networks NN according to embodiments of the present application.

The signal translation learning process according to the embodiment of the present application may be performed using a plurality of pieces of data obtained from a memory or a database. Hereinafter, an example of translation between images in different domains will be assumed and described.

FIG. 7 is a diagram showing an example of a configuration of a neural network NN according to an embodiment of the present application. For example, the neural network NN may include one or more networks and the networks may each include a plurality of layers. Hereinafter, for convenience of description, it is assumed and described that signal translation learning process is performed using one or more networks. Referring to FIG. 7, the neural network NN may include, for example, a first network 101, a second network 102, a third network 103, a fourth network 104, and a fifth network 105. In the first to fifth networks, steps for signal translation learning may be performed in a sequential manner or in a parallel manner.

Hereinafter, operations which can be performed in the respective networks will be described in detail.

First, the first network 101 may be a network for translating a source signal X of a first domain into a FM.

For example, the first network 101 may be a convolution network and may include a plurality of layers. In this case, in the first network 101, a plurality of features included in the source signal X may be extracted using the plurality of layers.

When the source signal X is an image, the plurality of features may include, for example, edge, sharpness, depth, brightness, contrast, blur, shape, or a combination of shapes and the plurality of features are not limited to the above-described examples.

The FM may be a combination of the plurality of features and each of regions in the source signal may be identified through one or more FMs. Each of the regions may include an ROI of the user and an error region including at least one artifact in the source signal. For example, when the source signal X is an ultrasound image of a fetus, the ROI may be a facial region of the fetus and the error region may be a body region of the fetus rather than the facial region. For example, the facial region may include an eye, a nose, a mouth, an ear, or the like of the fetus. Further, for example, the error region may include a hand, a foot, a placenta, amniotic fluid, or the like of the fetus.

Therefore, the FM may be obtained from at least one layer of the plurality of layers using the first network 101. Alternatively, the FM may be obtained from a last layer of the plurality of layers. One or more FMs generated in the first network 101 may be used as input data of the second network 102 and/or third network 103.

Meanwhile, parameters for the plurality of layers may be adjusted and at least one layer of the plurality of layers may be removed or added in calculation according to a result of performing signal processing of the neural network according to the embodiment of the present application. A detailed description of the parameter adjustment will be described below in the related section.

The second network 102 may be a network for generating a virtual signal Yv of the second domain using one or more FMs input from the first network 101 described above as input data. The second network 102 may be trained to translate the source signal X of the first domain into the virtual signal Yv of the second domain.

For example, the second network 102 may include a plurality of layers. In the second network 102, the virtual signal Yv in which features of a destination signal (an original signal) of the second domain are mapped to corresponding features of the FM using the plurality of layers may be generated.

When the source signal X is an image, the features of the destination signal may include, for example, brightness, color, reflection color, texture, depth, blending, shape, or a combination of shapes, and the like of the image.

The one or more FMs which are input to the second network 102 from the first network 101 described above may include features of the ROI (e.g., an eye, a nose, a mouth, an ear, etc.) in the source signal X.

Alternatively, the second network 102 may be trained to identify features associated with the error region (e.g., a hand, a foot, a placenta, etc.) in one or more FMs input from the first network 101 described above.

The virtual signal Yv may be a signal which is generated using the one or more FMs and includes the ROI in the source signal X.

For example, when the source signal X is the ultrasound image of the fetus, the virtual signal Yv translated in the second network 102 may be an image of the second domain in which the features of the error region in the ultrasound image X are included less. Alternatively, for example, the virtual signal Yv may be an image of the second domain which is obtained by removing at least one feature of the error region in the ultrasound image X. Alternatively, for example, the virtual signal Yv may be an image of the second domain which is obtained by removing all the features of the error region in the ultrasound image X.

The destination signal and/or the features of the destination signal may be obtained from the database 20, the memory, or the external server, which is described above. Alternatively, the second network 102 may further include a subnetwork (not shown) for extracting the features of the destination signal. The subnetwork may be, for example, a convolution network, and may include a plurality of layers. An operation of extracting the features of the destination signal through the subnetwork may correspond to the operation performed in the first network 101 described above.

Therefore, the server 10 may obtain the virtual signal of the second domain, which is obtained by combining the features of the destination signal and the at least one FM, through the second network 102. When a plurality of combined signals for a plurality of FMs are extracted, the server 10 may obtain a single virtual signal by combining the combined signals.

Meanwhile, parameters for the plurality of layers may be adjusted and at least one layer of the plurality of layers may be removed or added in calculation according to a result of performing signal processing of the neural network according to the embodiment of the present application. A detailed description of the parameter adjustment will be described below in the related section.

The third network 103 may be a network for generating an error signal Ye using one or more FMs input from the first network 101 described above as input data. For example, the error signal Ye may be a signal of the first domain, the second domain, or an intermediate domain between the first domain and the second domain.

The one or more FMs input to the third network 103 may include at least one of the features of the error region (e.g., a hand, a foot, a placenta, amniotic fluid, etc.) which is not the ROI in the source signal X.

The error signal Ye may be generated using the one or more FMs and may be a signal including at least one of the features associated with the error region in the source signal X.

Therefore, the server 10 may obtain the error signal Ye through the third network 103. For example, when a plurality of combined signals for a plurality of FMs are extracted, the server 10 may obtain a single virtual signal by combining the combined signals.

Alternatively, the third network 103 may be trained to extract or separate the error signal Ye including at least one of the features associated with the error region included in the source signal X of the first domain.

For example, the third network 103 may be a convolution network or a deconvolution network and may include a plurality of layers. In the third network 103, the error signal Ye may be generated using at least one of the plurality of layers. For example, a first error signal may be extracted through any first layer of the plurality of layers and a second error signal may be extracted through a second layer. In other words, a plurality of error signals may be obtained or extracted through the plurality of layers.

Further, the server 10 may obtain a target signal $Y_T$, which is obtained by combining of the virtual signal Yv obtained from the second network 102 and the error signal Ye obtained from the third network 103, and the target signal $Y_T$ may be used as input data of the fourth network 104. Hereinafter, the process of obtaining the target signal $Y_T$ will be described in detail.

The target signal $Y_T$ may be a signal in which a first weight is applied to the error signal Ye and a second weight is applied to the virtual signal Yv and may be calculated as, for example, Equation 1. Referring to Equation 1, the target signal $Y_T$ may be generated by summing of element-wise product of the virtual signal Yv and the second weight and element-wise product of the error signal Ye and the first weight.

$$Y = Yv \odot (1-We) + Ye \odot We \qquad [\text{Equation 1}]$$

Here, We denotes the first weight applied to the error signal Ye and (1-We) denotes the second weight applied to the virtual signal Yv. The first weight applied to the error signal Ye may be a value adjusted according to a result of performing image processing of the neural network NN according to the embodiment of the present application.

Further, the second weight applied to the virtual signal Yv may be calculated based on the first weight. In this case, the first weight and the second weight may be the same value or different values.

For example, the first weight may be a value calculated based on a difference between a reconstructed signal X" reconstructed using only the virtual signal Yv in the fourth network 104, which will be described below, and the source signal X. The method of calculating the first weight will be described in detail in the related embodiment.

The fourth network 104 may be a network for inversely translating the target signal $Y_T$ of the second domain, which is generated using the second network 102 and the third network 103 described above, into a reconstructed signal X' of the first domain.

For example, the fourth network 104 may be configured to accurately reconstruct the source signal X, and thus the consistency of contents between the reconstructed signal and the source signal may be improved. Here when the ultrasound image of the fetus is translated into the real photographic image, the consistency of the contents may be a likeness between the fetus in the ultrasound image and the fetus in the translated real photographic image.

Alternatively, for example, the neural network NN may simultaneously learn the process of translating the source signal X of the first domain into the target signal $Y_T$ of the second domain and the process of translating the translated target signal $Y_T$ of the second domain into the reconstructed signal X' of the first domain, through the second network 102 and the third network 103, and thus the neural network NN may be trained so as to translate the domain while maintaining the consistency of the entire trained contents.

In this case, parameters applied to at least one of the neural networks NN may be adjusted on the basis of a difference value between the reconstructed signal X' generated by inversely translating the target signal $Y_T$ and the source signal X. That is, the parameters may be adjusted by inversely transmitting a loss function $L_{rec}$ caused by the difference between the reconstructed signal X' and the source signal X to at least one of the networks described above. The loss function $L_{rec}$ may be expressed by the following Equation 2.

$$L_{rec}(X,X')=\|X-X'\|_1 \quad \text{[Equation 2]}$$

Alternatively, the fourth network 104 may be a network for inversely translating the virtual signal Yv generated from the second network 102 in order to calculate the first weight described above into the reconstructed signal X" of the first domain.

In this case, since the fourth network 104 generates the reconstructed signal X" of the first domain using only the virtual signal Yv, the neural network NN may be learned so as to identify a portion (e.g., an error region) that cannot be reconstructed using only the virtual signal Yv, by using the reconstructed signal X". A method of guiding information on the error region so that the neural network NN identifies the error region will be described in detail in the following related section.

The fourth network 104 may include one or more networks and may include a plurality of layers. For example, the fourth network 104 may include a first subnetwork (not shown) for translating the target signal $Y_T$ or the virtual signal Yv into a FM, and a second subnetwork (not shown) for generating the reconstructed signal X' or X" by applying the translated FM as input data. For example, the first subnetwork may be a convolution network and the second subnetwork may be a deconvolution network.

Hereinafter, for convenience of description, it is assumed and described that the fourth network 104 includes at least a first subnetwork and a second subnetwork. Further, in the first subnetwork, signal translation may be performed in the same or similar manner as the first network described above, and in the second subnetwork, signal translation may be performed in the same or similar manner as the second network and third network described above.

The first subnetwork may include a plurality of layers, and the target signal $Y_T$ or the virtual signal Yv may be translated into one or more FMs using the plurality of layers. For example, in the first subnetwork, a plurality of pieces of feature information (features) included in the target signal $Y_T$ or the virtual signal Yv may be extracted using the plurality of layers, and one or more FMs may be generated on the basis of the plurality of pieces of feature information. The one or more FMs generated in the first subnetwork may be applied as input data of the second subnetwork.

The second subnetwork may include a plurality of layers, and the target signal $Y_T$ or the virtual signal Yv may be translated into the reconstructed signals X' and X" using the plurality of layers. That is, in the second subnetwork, the reconstructed signals X' and X" may be generated by mapping the features of the source signal X to the features of the one or more FMs input from the first subnetwork. The feature information of the source signal X may be information extracted through the first network 101 described above and may be obtained from a storage (not shown) of the server 10.

Therefore, the server 10 may obtain the reconstructed signal X' or X" of the first domain, which are obtained by combining the features of the source signal X and the at least one FM, through the fourth network 104. When the plurality of combined signals for the plurality of FMs are extracted, the server 10 may obtain a single reconstructed signal X' or X" by combining the combined signals.

Meanwhile, the virtual signal Yv of the second domain generated using the second network 102 described above may be used as input data of the fifth network 105.

The fifth network 105 may be a network for distinguishing the virtual signal Yv generated from the second network 102 described above from a destination signal YR of the second domain.

For example, the fifth network 105 may be trained so as to distinguish the virtual signal Yv from the destination signal YR. For example, the fifth network 105 may be a convolution network and may include a plurality of layers. In this case, in the fifth network 105, information on similarity between the virtual signal and the destination signal may be output through a last layer of the plurality of layers. Here, the similarity may refer to a likeness of qualitative features between the virtual signal and the destination signal.

The destination signal may be obtained from the database 20 described above. For example, the destination signal may be an image obtained by actually capturing a face of a newborn baby.

The information on the similarity may be information indicating a probability that the virtual signal Yv corresponds to the destination signal. For example, when the virtual signal Yv corresponds to an actually captured image, the similarity value may be 1 or a value close to 1. Further, for example, when the virtual signal Yv is not the actually captured image, the similarity value may be 0 or a value close to 0.

Therefore, the server 10 may feedback the information on the similarity to at least one of the first network 101 to the third network 103. The server 10 may repeatedly perform the operations of the second network 102 and the third network 103 on the basis of the information on the similarity and may reobtain the virtual signal Yv. Alternatively, for example, the fifth network 105 may feedback a loss function, which is generated by a difference between the virtual signal and the destination signal, to the first network 101 and the second network 102 described above. Therefore, parameters of at least one layer of the plurality of layers included in the first network and the second network may be adjusted. Alternatively, at least one layer of the plurality of layers included in the first network 101 and the second network 102 may be removed or added in calculation. In other words, the first network 101 and the second network 102 may be trained using the difference between the virtual signal and the destination signal, which is fed back from the fifth network 105.

FIG. 8 is a diagram showing an example of a configuration of a neural network NN according to another embodiment of the present application. As shown in FIG. 8, the neural network NN according to another embodiment of the present application may further include a feature classification network 106.

The feature classification network 106 may be a network for classifying features associated with the error region and features associated with the ROI among the regions in the source signal X. In this case, the feature classification network 106 may be a portion in the first network 101. Alternatively, as shown in FIG. 8, the feature classification network 106 may be configured separately from the first network 101 and may be disposed between the first network 101 and the second and third networks 102 and 103.

For example, the feature classification network 106 may generate a first FM and a second FM using the one or more FMs generated in the first network 101. For example, the first FM may be features associated with effective features and may be features including fewer features associated with the error region. For example, the second FM may be features associated with erroneous features and may be features including fewer features associated with the ROI. For example, when the source signal is the ultrasound image of the fetus, the features associated with the ROI may include an eye, a nose, a mouth, an ear, or the like of the fetus. Further, for example, the features associated with the error region may include, for example, a hand, a foot, a placenta, amniotic fluid, or the like of the fetus.

Further, for example, the feature classification network 106 may classify the features into the first FM related to the ROI and the second FM related to the error region in the source signal X on the basis of a preset criterion. The preset criterion may be previously trained based on the information on the ROI and the information on the error region in the source signal X.

Therefore, in the feature classification network 106 according to another embodiment of the present application, the first FM related to the ROI may be transmitted as input data of the second network 102 and the second FM related to the error region may be transmitted as input data of the third network 103. The features associated with the error region may be more accurately classified through the feature classification network 106. For example, in the second network 102, the virtual signal Yv which is obtained by removing the features associated with at least one error region in the source signal may be generated using the first FM related to the ROI, which is input through the feature classification network 106.

Meanwhile, the feature classification network 106 may be updated by reflecting the parameters which are adjusted using the difference between the reconstructed signal X' and the source signal X. Alternatively, the feature classification network 106 may be updated by reflecting the parameters which are adjusted using the difference between the virtual signal and the destination signal. A detailed description of the parameters will be given in the related section.

Hereinafter, embodiments of a signal translation learning method performed through the neural network NN described above will be described in detail.

Figure 9:
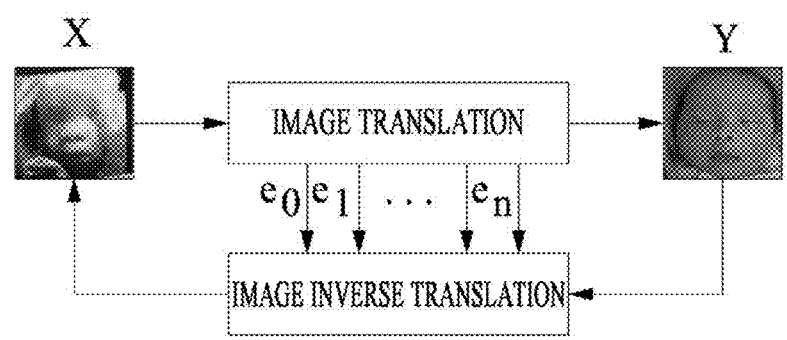
FIG. 9 is a schematic diagram for describing a signal translation learning process according to one embodiment of the present application.
Figure 10:
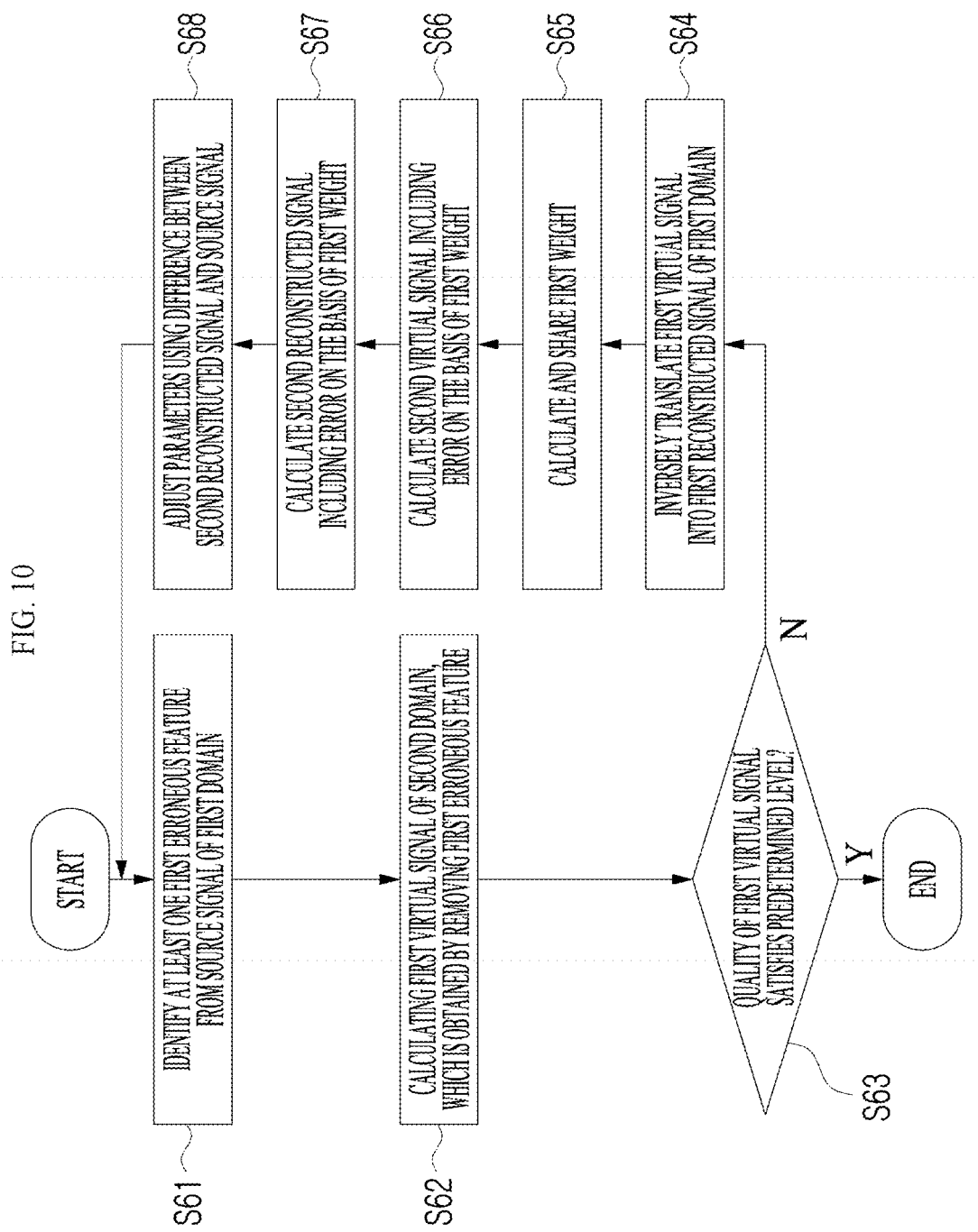
FIG. 10 is a flowchart for describing an example of a learning method according to a fourth embodiment of the present application.

FIG. 9 is a schematic diagram for describing a signal translation learning process according to a fourth embodiment of the present application. Further, FIG. 10 is a flowchart for describing an example of a learning method according to the fourth embodiment of the present application, for translating the source signal X of the first domain into the virtual signal Yv of the second domain, and providing the virtual signal Yv of the second domain.

For example, the learning method according to the fourth embodiment of the present application may be performed by the learning module M located in the server 10 described above, and at least one of the first network to the fifth network described above may be provided in the learning module M.

Referring to FIG. 9, in the learning method according to the fourth embodiment of the present application, the process of translating the source signal of the first domain into the virtual signal of the second domain and the process of inversely translating the translated virtual signal into the reconstruction signal of the first domain may be repeatedly performed. For example, the source signal of the first domain may be an ultrasound image X of a fetus, and the virtual signal of the second domain may be an image Y obtained by combining the features of the ultrasound image of the fetus and features of a real photographic image of a newborn baby. In this case, in the process of translating the source signal X into the virtual signal Y, one or more error signals $e_0$ to $e_n$ may be identified.

Hereinafter, steps in which signal translation learning according to the fourth embodiment of the present application is performed will be described in detail with reference to FIG. 10.

Referring to FIG. 10, the learning method according to the first embodiment of the present application, which is a method of translating the source signal of the first domain into the virtual signal of the second domain using at least one network, may include identifying at least one first erroneous feature from the source signal of the first domain (S61), calculating a first virtual signal of the second domain, which is obtained by removing the first erroneous feature (S62), and determining whether the quality of the first virtual signal satisfies a predetermined level (S63). The learning method according to the first embodiment of the present application may further include inversely translating the first virtual signal into a first reconstruction signal of the first domain (S64) when it is determined that the quality of the first virtual signal does not satisfy the predetermined level, calculating a first weight using a difference between the first reconstruction signal and the source signal and sharing the first weight with the network (S65), generating a second virtual signal of the second domain including the first erroneous feature using the first weight (S66), inversely translating the second virtual signal into a second reconstruction signal of the first domain (S67), and adjusting parameters of the network using a difference between the second reconstruction signal and the source signal (S68).

Hereinafter, as described with reference to FIG. 9, an example case in which the source signal of the first domain is the ultrasound image X of the fetus and the virtual signal of the second domain is the image Yv obtained by combining the ultrasound image of the fetus and the features of the real photographic image of the newborn baby will be described in detail.

First, as described above, at least one ultrasound image X may be input through the first network 101 and the learning module M may be trained using the ultrasound image X as input data.

The learning module M may identify at least one first erroneous feature from the source signal of the first domain (S61).

For example, as described above, the learning module M may identify at least one erroneous feature (e.g., a hand, a foot, a placenta, etc.) included in the ultrasound image X of the fetus using one or more features provided through the first network 101. For example, the erroneous features may be extracted using an arbitrary layer among the plurality of layers included in the first network 101 and the extracting of the erroneous features may be repeatedly performed.

For example, the learning module M may extract a first erroneous feature $e_1$ through an arbitrary first layer of the plurality of layers included in the first network 101. Further, the learning module M may extract a second erroneous feature $e_2$ through an arbitrary second layer of the plurality of layers included in the first network 101. For example, the first erroneous feature $e_1$ may include a feature associated with the hand of the fetus included in the ultrasound image X of the fetus. Further, the second erroneous feature $e_2$ may include a feature associated with the foot of the fetus included in the ultrasound image X of the fetus.

Meanwhile, the process of extracting the erroneous features, which is performed in the learning module M, may correspond to the operation performed in the first network 101, the second network 102, the third network 103, and/or the feature classification network 106 described above.

The learning module M may calculate the first virtual signal of the second domain, which is obtained by removing the first erroneous feature (S62).

For example, the learning module M may generate a first virtual signal Yv of the second domain by reflecting the first erroneous feature which is identified in step S61. Referring to FIG. 10, the learning module M may combine the virtual signal Yv which is obtained by removing the feature associated with the hand of the fetus. The process of calculating the virtual signal, which is performed in the learning module M, may correspond to the operation performed in the second network 102 described above.

Meanwhile, in the learning method according to the first embodiment of the present application, the learning module M may further generate a first error signal using the erroneous feature identified in step S61. In this case, the process of generating the error signal may correspond to the operation performed in the third network 103 described above.

The learning module M may determine whether the quality of the first virtual signal satisfies a predetermined level (S63).

In other words, the learning module M repeatedly performs the following learning process until the quality of the first virtual signal calculated in step S62 reaches the predetermined level and terminates the learning process when it is determined that the quality of the virtual signal reaches the predetermined level.

In this case, it may be determined whether the quality of the virtual signal reaches the predetermined level in various manners.

Here, a preset termination condition may be a condition pre-input by the user.

For example, the user may set the learning module M so that it repeats the learning process a predetermined number of times.

Alternatively, for example, the user may set the learning process so that it is repeatedly performed until the loss function of the neural network NN is not reduced.

Alternatively, for example, the learning module M may obtain information on the similarity between the virtual signal and the destination signal of the second domain through the fifth network 105 described above. The destination signal may be obtained from the database 20 described above. For example, the destination signal may be an image obtained by actually capturing the face of the newborn baby. The information on the similarity indicates the probability that the virtual signal corresponds to the actually captured image, and a description thereof has been given above. Therefore, hereinafter, a detailed description thereof will be omitted.

The learning module M may perform the following learning processes when it is determined that the quality of the first virtual signal satisfies the predetermined level.

The learning module M may inversely translate the first virtual signal into the first reconstruction signal of the first domain (S64).

For example, the learning module M may inversely translate the first virtual signal generated in step S62 into the first reconstruction signal of the first domain. The process of inversely translating the first virtual signal into the first reconstruction signal may correspond to the operation performed in the fourth network 104 described above.

Further, the learning module M may calculate the first weight using the difference between the first reconstruction signal and the source signal and share the first weight with the network (S65).

For example, the first weight may be the difference between the first reconstruction signal and the source signal.

Alternatively, for example, the first weight may be a gradient which is calculated by differentiating the difference between the first reconstruction signal and the source signal X with respect to a virtual image or an arbitrary FM. For example, the gradient may be calculated as shown in Equation 3.

$$g = \frac{\partial Lrec}{\partial Yv} \qquad \text{[Equation 3]}$$

Therefore, since the first weight reflects information on a region (e.g., an error region) that cannot be restored by only the first virtual signal Yv, the information on the error region included in the source signal may be guided.

In this case, the source signal X may be 3D data in which three R, and B channels are merged, and a gradient g for each channel may be adjusted by normalization. The normalization may be performed with various methods. For example, a weight We may be calculated using a standard normal distribution using mean and standard deviation for each channel as shown in the following Equation 4.

$$Z_C = \frac{(\mu_c - g_c)}{(\sigma_c + \varepsilon)} \qquad \text{[Equation 4]}$$

Here, c denotes each of R, G, and B channels.

Further, a value of the weight We may be adjusted to have a range of 0 to 1, for example, a range of 0.5 to 1, by applying a sigmoid function to the value of the gradient g, which is normalized using Equation 4, and may be calculated as Equation 5 below.

$$We = \text{sigmoid}(|z|) \qquad \text{[Equation 5]}$$

In other words, the information on the error region in the source signal X may be shared with at least one of the first network to the fifth network.

The learning module M may generate the second virtual signal of the second domain including the first erroneous feature using the first weight (S66) and may inversely translate the second virtual signal into the second reconstruction signal of the first domain (S67).

For example, in the learning process performed using the neural network NN, the second virtual signal may be generated by combining the first virtual signal and the first error signal in order to maintain the consistency of the contents in the source signal. The process of generating the second virtual signal may correspond to the method of generating the target signal T described above with reference to FIG. 7.

Further, the learning module M may inversely translate the second virtual signal into the second reconstruction signal of the first domain using the fourth network 104 described above. That is, the consistency of the content in the inversely translated signal and the content in the source signal may be compared using the difference between the signal inversely translated based on the second virtual signal and the source signal.

The learning module M may adjust the parameters of the neural network using the difference between the second reconstruction signal and the source signal (S68).

Here, the parameters may be adjusted according to the loss function calculated by the difference between the second reconstruction signal and the source signal.

The learning module M may inversely transmit the parameters to the first neural network 101, the second neural network 102, the third neural network 103, the fourth neural network 104, the fifth neural network 105, and/or the feature classification network 106 described above. Accordingly, the parameters applied to the plurality of layers included in each network may be adjusted, and any one layer of the plurality of layers may be removed.

That is, in the learning method according to the fourth embodiment of the present application, optimal parameters applied to the plurality of layers included in the neural network NN described above may be derived by repeatedly performing the process of translating the source signal of the first domain into the virtual signal of the second domain.

Therefore, the signal translation module T according to the embodiment of the present application may provide the virtual signal which is obtained by removing the erroneous features which are present in the source signal, by performing the signal translation operation using the parameters transmitted from the learning module M.

In this case, the server 10 may update the optimal parameters applied to the neural network NN by continuously performing a machine learning process performed by the learning module M.

As a result, in the signal translation providing system 1 according to the embodiment of the present application, the quality of the virtual signal may be improved.

Figure 11:
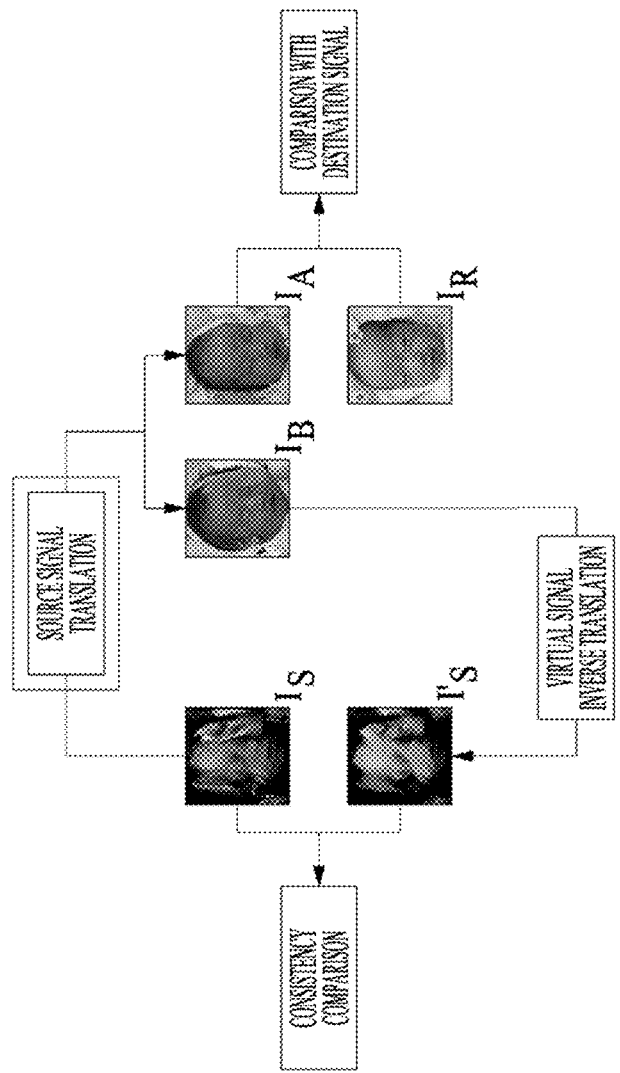
FIG. 11 is a schematic diagram for describing a learning method according to a fifth embodiment of the present application.

FIG. 11 is a schematic diagram for describing a signal translation learning process according to a fifth embodiment of the present application. Further, FIG. 12 is a flowchart for describing an example of a learning method according to the fifth embodiment of the present application, which translates the source signal X of the first domain into the virtual signal Yv of the second domain and provides the virtual signal Yv of the second domain.

For example, the learning method according to the second embodiment of the present application may be performed by the learning module M located in the server 10 described above, and at least one of the first network to the fifth network described above may be provided in the learning module M.

Referring to FIG. 11, in the learning method according to the fifth embodiment of the present application, in the process of translating the source signal of the first domain into the virtual signal of the second domain, each of a first virtual signal $I_A$ and a second virtual signal $I_B$ may be generated in order to maintain the consistency of the content in the source signal and learn the features associated with the error region in the source signal.

For example, the first virtual signal $I_A$ may be a signal translated by selecting only the features associated with the ROI of the user in the source signal. Further, for example, the second virtual signal $I_B$ may be a signal translated using all the features in the source signal.

As shown in FIG. 11, the source signal of the first domain may be the ultrasound image $I_S$ of the fetus, and the first virtual signal $I_A$ of the second domain may be an image obtained by combining the features of the facial region of the fetus in the ultrasound image and the features of the real photographic image of the newborn baby. Further, the second virtual signal $I_B$ of the second domain may be an image obtained by combining all the features including the erroneous features in the ultrasound image and the features of the real photographic image of the newborn baby.

Hereinafter, steps in which the signal translation learning process according to the fifth embodiment of the present application is performed will be described in detail with reference to FIG. 12.

Referring to FIG. 12, the learning method according to the fifth embodiment of the present application may include obtaining a plurality of features from the source signal of the first domain (S111), generating a first virtual signal which uses the first feature and a second virtual signal which uses all the plurality of features (S112), inversely translating the second virtual signal into a reconstruction signal of the first domain and comparing the consistency using a difference between the inversely translated reconstruction signal and the source signal (S113), calculating the similarity between the first virtual signal and the destination signal of the second domain (S114), and determining whether the quality of the first virtual signal satisfies a predetermined level (S115). The steps described below are exemplarily described for convenience of description, and each step may be performed in a sequential manner or in a parallel manner.

Hereinafter, as described with reference to FIG. 11, an example case in which the source signal of the first domain is the ultrasound image $I_S$ of the fetus and the first virtual signal $I_A$ and the second virtual signal $I_B$ of the second domain are images obtained by combining the ultrasound image of the fetus and the features of the real photographic image of the newborn baby will be described in detail.

First, as described above, at least one ultrasound image $I_S$ may be input through the first network 101, and the learning module M may be trained using the ultrasound image $I_S$ as input data.

The learning module M may obtain the plurality of features from the source signal of the first domain (S111).

For example, the learning module M may extract the plurality of features from the ultrasound image of the first domain. For example, the plurality of features may include a first feature (an effective feature) associated with the ROI of the user and a second feature (an erroneous feature) associated with at least one error region.

Further, for example, the plurality of features may be extracted through an arbitrary layer of the plurality of layers included in the first network 101, and the process of extracting the erroneous feature in the learning module M may correspond to the operation performed in the first network 101 described above.

The learning module M may generate the first virtual signal which uses the first feature and the second virtual signal which uses all the plurality of features (S112).

The learning module M may distinguish the first feature and/or the second feature among the plurality of features obtained in step S111. For example, the learning module M may select the feature associated with the error region among the plurality of features using a preset criterion or the parameters transmitted through the previous learning process.

For example, the first feature may include a feature associated with a facial region of the fetus among the plurality of features and may be a feature obtained by removing at least one second feature. For example, the first feature may include a feature associated with a facial region of the fetus such as an eye, a nose, a mouth, an ear, or the like, and may not include features other than the facial region of the fetus such as a hand, a foot, or the like.

Therefore, the learning module M may generate the first virtual signal in which the feature associated with the hand and foot of the fetus is removed using the second network 102 and/or the third network 103 described above and generate the second virtual signal including the feature associated with the hand and foot of the fetus.

The learning module M may inversely translate the second virtual signal into the reconstruction signal of the first domain and may compare the consistency using the difference between the reconstructed signal and the source signal (S113).

That is, the learning module M may inversely translate the second virtual signal generated in step S112 into the reconstruction signal of the first domain. The process of translating the second virtual signal into the reconstructed signal may correspond to the operation performed in the fourth network 104 described above, and thus a detailed description thereof will be omitted.

For example, referring to FIG. 11, the learning module M may compare the difference between a reconstructed image $I'_S$ obtained by reconstructing the second virtual signal $I_B$ including the feature associated with the hand of the fetus and the source signal Is.

Therefore, the learning module M may maintain the consistence of the content in the source signal by inversely transmitting the difference between the inversely translated reconstruction signal $I'_S$ and the source signal Is to the neural network NN using only the second virtual signal $I_B$.

Further, the learning module M may distinguish the first virtual signal and the destination signal of the second domain (S114).

That is, the learning module M may determine the similarity between the first virtual signal $I_A$, which is obtained by removing at least one erroneous feature included in the source signal, and the destination signal $I_R$ of the second domain, by using the fifth network 105 described above. Here, the similarity may refer to a likeness of qualitative features between the virtual signal and the destination signal.

For example, referring to FIG. 11, the learning module M may calculate a probability that the first virtual image $I_B$ which is obtained by removing the feature associated with the hand of the fetus in the ultrasound image corresponds to the real photographic image $I_R$ of the newborn baby. Therefore, the neural network NN may be trained so as to generate a virtual image which is close to the real photographic image $I_R$ and thus the quality of the virtual image may be further improved.

Further, the learning module M may determine whether the quality of the first virtual signal satisfies the predetermined level (S115).

For example, the learning module M may determine whether the quality of the first virtual signal $I_A$ satisfies the predetermined level using the similarity determined in step S114 and repeatedly perform the above steps until the quality of the first virtual signal reaches the predetermined level.

Alternatively, for example, the learning module M may update the parameters for generating a virtual signal having a desired quality by repeatedly performing the above steps S111 to S114 until a preset termination condition is satisfied.

Here, the preset termination condition may be a condition pre-input by the user.

Alternatively, for example, the user may set the learning module M so that it repeats the above steps S111 to S114 a predetermined number of times. Alternatively, for example, the user may set so that the above steps S111 to S114 are repeatedly performed until the loss function of the neural network NN is not reduced.

In this case, when it is determined in step S115 that the quality of the first virtual signal doe not reach the predetermined level, the learning module M may adjust the parameters for the plurality of layers of the neural network NN on the basis of the virtual signals and the loss function.

Therefore, the learning module M may transmit the parameters for the plurality of layers of the neural network NN derived through the above steps S113 and S114 of the corresponding learning process to the signal translation module T.

On the other hand, when it is determined in step S115 that the quality of the first virtual signal does reach the predetermined level, the learning module M may terminate the learning process.

Therefore, in the learning method according to the fifth embodiment of the present application, the consistency of the content in the source signal may be trained by the process in which the second virtual signal translated using all the features in the source signal of the first domain is inversely translated into the signal of the first domain. Further, at least one erroneous feature may be identified and the first virtual signal $I_A$, which is obtained by removing the erroneous features, may be distinguished from the destination signal of the second domain, and thus the consistency of the content in the source signal may be trained to generate the first virtual signal which is obtained by removing the erroneous features included in the source signal.

That is, in the learning method according to the fifth embodiment of the present application, the process in which the parameters are adjusted by translating the source signal of the first domain into the virtual signal of the second domain and measuring the loss function may be repeatedly performed, and thus the optimal parameters applied to the plurality of layers included in the neural network NN described above may be derived.

Therefore, the signal translation module T according to the embodiment of the present application may perform the signal translation operation using the parameters transmitted from the learning module M and provide a virtual signal having the quality of a predetermined level or higher. In this case, the server 10 may perform the machine learning process performed by the learning module M every predetermined period to update the optimal parameters applied to the neural network NN.

Meanwhile, in the above-described embodiments of the present application, the learning may be performed in the same manner in the process of inversely translating the virtual signal of the second domain into the reconstruction signal of the first domain as well as in the process of translating the source signal of the first domain into the virtual signal of the second domain.

For example, as shown in FIG. 11, the learning may be performed so that the image $I'_S$ which is obtained by translating the real photographic image $I_R$ of the newborn baby of the second domain into the ultrasound image of the fetus of the first domain is distinguished from the ultrasound image $I_S$ of the fetus of the first domain. Further, an image $I'_R$ which is obtained by inversely translating the image $I'_S$, which is translated into the ultrasound image, into the real photographic image of the second domain may be compared with the real photographic image $I_R$ of the newborn baby, and thus the consistency of the contents in the inversely translated image $I'_R$ and the real photographic image $I_R$ may be maintained.

As a result, the signal translation providing system 1 according to the embodiment of the present application may repeatedly perform the learning process described above to provide the virtual signal having the quality of a predetermined level to the user apparatus 30.

For example, in the case in which the input signal of the first domain is the ultrasound image of the fetus, the user may obtain the virtual image of the second domain, which is obtained by removing the erroneous feature, even when the face of the fetus in the source image of the first domain is covered by at least one erroneous feature of the hand, the foot, the placenta, and the amniotic fluid.

For the convenience of explanation, it is assumed and described that the functions of the signal translation are performed in the server 10. However, the functions of the signal translation described above may be provided to be recorded in a readable medium in a computer.

That is, methods of translating the signal according to the embodiments of the present application may be implemented in the form of program instructions that can be performed through various computer units and recorded in computer readable media. The computer readable media may include a program instruction, a data file, a data structure, or combinations thereof. The program instruction recorded in the recording media may be specially designed and prepared for the invention or may be an available well-known instruction for those skilled in the field of computer software. The recording media includes a hardware device that is specially made to store and perform the program instruction, for example, magnetic media such as a hard disk, a floppy disk, and a magnetic tape, optical media such as a compact disk read only memory (CD-ROM) or a digital video disk (DVD), magneto-optical media such as a floptical disk, a ROM, a random access memory (RAM), or a flash memory. Examples of the program instruction may include a machine code generated by a compiler and a high-level language code that can be executed in a computer using an interpreter. Such a hardware device may be configured as at least one software module in order to perform operations of the invention and vice versa.

According to the embodiments of the present application, a virtual signal of a second domain, which is obtained by removing erroneous features included in an input signal of a first domain, can be output.

As described above, while the embodiments have been described with reference to specific embodiments and drawings, various modifications and alterations may be made by those skilled in the art from the above description. For example, when the described technologies are performed in orders different from the described methods, and/or the described components such as a system, a structure, a device and a circuit are coupled or combined in the form different from the described method, or replaced or substituted with other components or equivalents, the appropriate result may be achieved.

Therefore, other implementations, other embodiments and equivalents within the scope of the appended claims are included in the range of the claims to be described.

What is claimed is:

1. A method of translating a source image of a first domain into a virtual image of a second domain which is different from the first domain, the method comprising:

receiving a source image of a first domain;
obtaining a destination image of a second domain;
identifying a plurality of features in the source image of the first domain and features of the destination image;
translating the source image of the first domain into a first virtual image of the second domain using a pre-trained neural network, including:
classifying the plurality of features in the source image of the first domain into effective features of the source image and erroneous features of the source image based on whether each feature of the plurality of features corresponds to the features of the destination image of the second domain, wherein the effective features correspond to the features of the destination image and the erroneous features do not correspond to the features of the destination image;
generating the first virtual image of the second domain by synthesizing the effective features of the source image with the features of the destination image and removing the erroneous features of the source image; and
identifying a quality of the first virtual image by calculating a similarity between the first virtual image and the destination image and a similarity between the source image and a first reconstruction image obtained by inverting the first virtual image into the first domain, wherein the quality of the first virtual image is associated with a level at which the erroneous features are removed in the first virtual image.

2. The method of claim 1, further comprising:
determining whether the quality of the first virtual image satisfies a predetermined level; and
outputting the first virtual image of the second domain if the quality of the first virtual image is determined to satisfy the predetermined level.

3. The method of claim 2, the method further comprising:
if the quality of the first virtual image is determined to not satisfy the predetermined level, generating a second virtual image from the first reconstruction image as an input image.

4. The method of claim 3, wherein when a quality of the second virtual image of the second domain does not correspond to the predetermined level, inverting the second virtual image into a second reconstruction image of the first domain, and generating a third virtual image from the second reconstruction image as an input image, and
wherein the quality of the second virtual image of the second domain is identified by calculating a similarity of the second virtual image and the destination image.

5. The method of claim 1, wherein the source image of the first domain is an ultrasound image of a fetus, and the destination image of the second domain is an actual photographic image of a newborn baby.

6. The method of claim 5, wherein the first virtual image of the second domain is an actual photographic image of the fetus, which combines features of the actual photographic image with the effective features of the ultrasound image of the fetus excepting the erroneous features of the ultrasound image of the fetus.

7. A non-transitory computer readable medium storing a program causing a computer to execute the method of claim 1.

* * * * *